(12) United States Patent
Aiiso

(10) Patent No.: US 7,506,977 B1
(45) Date of Patent: Mar. 24, 2009

(54) PLASTIC SPECTACLES LENS

(75) Inventor: Yoshimitsu Aiiso, Sabae (JP)

(73) Assignee: Hopnic Laboratory Co., Ltd., Sabae-shi, Fukui (JP)

( * ) Notice: Subject to any disclaimer, the term of this patent is extended or adjusted under 35 U.S.C. 154(b) by 0 days.

(21) Appl. No.: 12/081,629

(22) Filed: Apr. 18, 2008

(51) Int. Cl.
*G02C 7/10* (2006.01)

(52) U.S. Cl. .................................. 351/163; 351/44

(58) Field of Classification Search ......... 351/163–165, 351/44

See application file for complete search history.

(56) References Cited

U.S. PATENT DOCUMENTS

| | | | | |
|---|---|---|---|---|
| 5,149,183 A | * | 9/1992 | Perrott et al. | 359/885 |
| 5,274,403 A | * | 12/1993 | Gott | 351/47 |
| 5,922,246 A | * | 7/1999 | Matsushita et al. | 252/582 |

FOREIGN PATENT DOCUMENTS

| | | |
|---|---|---|
| JP | S53-39910 | 10/1978 |
| JP | H02-254401 | 10/1990 |
| JP | H05-005860 | 1/1993 |
| JP | 3044017 | 3/2000 |
| JP | 3718185 | 9/2005 |
| WO | WO96/00247 | 1/1996 |

* cited by examiner

*Primary Examiner*—Scott J Sugarman
(74) *Attorney, Agent, or Firm*—Manabu Kanesaka

(57) ABSTRACT

A plastic spectacles lens containing an organic dye instead of a neodymium compound and having an optical transmission equivalent to a plastic spectacles lens containing a neodymium compound is provided. The plastic spectacles lens comprises a plastic lens wafer formed from a thermosetting or thermoplastic resin, or the plastic lens wafer and one, or two or more component layers formed on at least one side of the plastic lens wafer, and an organic dye satisfying the specific conditions.

23 Claims, 8 Drawing Sheets

F I G. 7
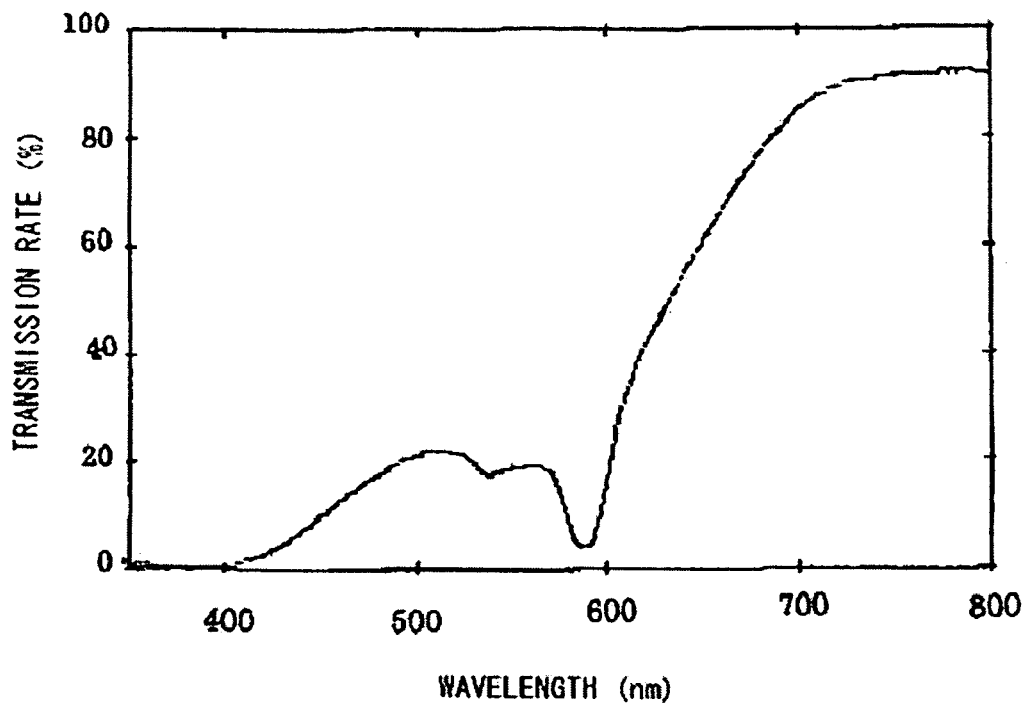
F I G. 8
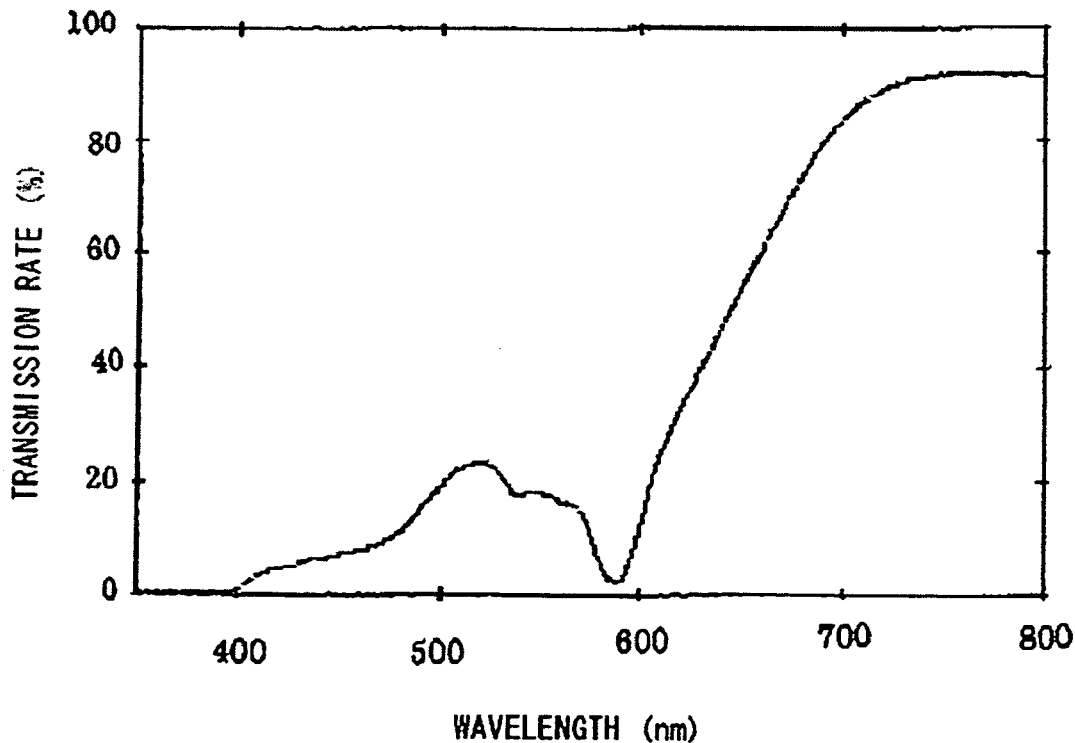

PLASTIC SPECTACLES LENS

BACKGROUND OF THE INVENTION

1. Field of the Invention

The present invention relates to a plastic spectacles lens containing an organic dye instead of a neodymium compound having optical absorbing performance. The plastic spectacles lens of the present invention exhibits optical transmission equivalent to a plastic spectacles lens containing a neodymium compound.

2. Description of Related Art

Reducing a displeasing feeling relevant to dazzle by visible rays, an indistinctness of contrast, visual fatigue, and the like, is one application object of a spectacles lens. As one of the measures, a spectacles lens is provided with a dazzle-preventing function. A principal measure is to shade dazzling wavelength rays as selectively as possible. In practice, a spectacles lens containing a neodymium compound which can highly selectively absorb visible rays near a wavelength of 585 nm is used. Such a spectacles lens can effectively prevent dazzle.

This technique is based on the principle of providing the spectacles lens with an appropriate light blocking effect. Excessive shading or blocking rays with inappropriate wavelength may, however, unnecessarily impair visibility which is the original objective of the spectacles lens. Thus, a technique capable of maintaining visibility as satisfactory as possible, and, at the same time, providing the spectacles lens with an appropriate light blocking effect is desired.

A method of adding a rare earth metal compound, particularly a neodymium compound, with an objective of providing a dazzle-preventing effect and increasing contrast, is widely used, as mentioned above. It is worth noting that a rare earth metal compound has a very sharp peak in the absorption spectrum in the wavelength band of the visible ray region, that is, the rare earth metal compound has a narrow absorption wavelength region and is wavelength-selective. The absorption peak of a neodymium compound, for example, near 585 nm wavelength is also very sharp.

This characteristic of possessing a sharp absorption peak contributes to the high optical transmission in the wavelength band required for visibility and also to selective absorption of rays in the wavelength band exhibiting a dazzling effect. Thus, the neodymium compound provides the spectacles lens with both a dazzle-preventing effect- and visibility. The glass containing a neodymium compound has extremely desirable properties as a dazzle-preventing spectacles lens.

A method of adding a rare earth metal oxide to a glass lens as disclosed in Patent Document 1 has been generally employed for manufacturing a rare earth metal compound-containing lens. In accordance with the trend of switching the lens material from glass to plastic, a plastic lens containing a specific organic rare earth metal complex has been developed.

However, the method of incorporating an organic rare earth metal complex into a plastic lens material leaves many problems to be solved. In the first place, selection of the organic moiety in the organic rare earth metal complex is considerably restricted according to the lens material. Only an expensive organic rare earth metal complex can be used in many cases. In particular, in the case of a thiourethane lens, a common organic rare earth metal complex can be used only with difficulty due to poor solubility and dispersibility in the resin, undesirable reactivity with the lens resin, and poor storage stability under ordinary conditions. Only a very specific organic rare earth metal complex as in Patent Document 2 has been disclosed, but the disclosed technology still leaves many problems to be solved.

In the second place, an organic rare earth metal complex must be added in an amount usually of about 5 wt % in order to achieve low light transmission rate (a high light blocking effect) to the light in the above-mentioned wavelength band. It is necessary to use a large amount of an expensive organic rare earth metal complex, but on the other hand, the amount of organic rare earth metal complex must be controlled so as not to impair the mechanical characteristics of the lens.

In view of this technological background, various methods of providing a plastic lens with a function of shading the light with a specific wavelength band as selectively as possible have been disclosed. For example, Patent Document 3 discloses a method of dying the lens by immersing the lens in an aqueous solution of a dye after molding, in order to provide dazzle-preventive properties, and Patent Documents 4, 5, and 6 disclose a method of curing a monomer after adding a cobalt compound or a specific organic dye to the monomer.

However, the dyes or compounds added in the method of Patent Documents 3 to have an absorption band different from the wavelength band of the neodymium compound. In addition, some compounds have an extremely wide absorption band that unnecessarily blocks light in other visible regions in order to attain an effective dazzle-preventing effect, with a result of undue sacrifice of visibility.

Patent Document 6 describes a lens with minimum optical transrmission close to 550 to 630 nm prepared by introducing a dye by a staining technique as a comparative example to the lens containing a neodymium compound. A defect of the technique of unduly decreasing clarity as compared with the case in which a neodymium compound is used is indicated.

Patent Document 7 discloses dazzle-preventing spectacles lens containing an organic dye which has a maximum absorption index near 575 nm and a comparatively sharp peak width. The lens is drastically improved in the absorption wavelength region, as well as in the above-mentioned region width, over the lenses disclosed in Patent Documents 3 to 6.

However, when the target level is achieved by the use of a neodymium compound, the absorption band narrowness is particularly insufficient not only in terms of providing the lens with brightness, but also in terms of providing the lens with various color tones such as a gray tone and a brown tone commonly used in commercial sunglasses. Thus, the proposed organic dyes have a problem of imposing a certain restriction to the commonly used technique of providing the lens with the target color tone by a combined use of other dyes.

In sunglasses or dark spectacles lenses to protect the eyes from environment light and to reduce a displeasing feeling, lenses with various color tones are used according to the use environment and user's demands. The technique of mixing two or more dyes to obtain the target color tone is usually employed. When the target color tone is produced by mixing dyes while maintaining the selective light absorption characteristics in a specific visible ray wavelength region as in the case of the present invention, a light absorption factor in a wavelength band other than the required selective light wavelength is preferably as small as possible, that is, the light absorption peak width is preferably as sharp as possible, in order to ensure a simple combination of dyes, a wide target color tone, and a color tone with little dullness.

Thus, it can be understood that a drawback common to the methods of staining a plastic lens with an organic dye replacing a neodymium compound is the extremely wide absorption band, and for this reason, it has been difficult to provide a lens with a superior dazzle-preventing effect and visibility, and excellent color-tone setting properties comparative to a rare earth metal.

[Patent Document 1] Japanese Patent No. 3044017

[Patent Document 2] WO 96/00247

[Patent Document 3] Examined Patent Publication No. 53-39910

[Patent Document 4] Japanese Patent Application Laid-open No. 5-5860

[Patent Document 5] Japanese Patent Application Laid-open No. 5-45610

[Patent Document 6] Japanese Patent Application Laid-open No. 2-254401

[Patent Document 7] Japanese Patent No. 3718185

SUMMARY OF THE INVENTION

The present invention has been achieved in view of the above-mentioned background art. Notwithstanding superior characteristics of excellently balanced dazzle-preventing properties and visibility, as well as the practical color tone, the plastic lens with an organic rare earth metal compound incorporated therein has many drawbacks such as poor solubility in resins depending on the type of the plastic, poor stability under a certain environment of light and heat depending on the type of the resin used for the lens, requirement of a large amount (e.g. usually several percentages) of the organic rare earth metal compound for providing a desired degree of dazzle-preventing effect, which results in a cost increase, and an adverse effect on mechanical strength of the lens when the compound is incorporated in a large amount. An object of the present invention is to provide a plastic spectacles lens based on economically advantageous additive types and amount of addition which, while possessing the superior characteristics of excellently balanced dazzle-preventing properties and visibility and the practical color tone-providing effect of the organic rare earth metal compound, can be applied to a wide variety of plastic lens materials, and can be dissolved to the extent of a necessary concentration level, while enabling the necessary concentration level to be set at an extremely low level, with a consequence of a minimal adverse effect on the mechanical characteristics of the lens.

The object of the present invention can be achieved in the present invention as follows. Specifically, the present invention provides, as described in claim 1, a plastic spectacles lens comprising a plastic lens wafer formed from a thermosetting or thermoplastic resin, or a plastic lens wafer and one, or two or more component layers formed on at least one side of the plastic lens wafer, either the plastic lens wafer or at least one of the component layers comprising an organic dye exhibiting a sharp absorption peak satisfying the following conditions (A), whereby the plastic spectacles lens needs not contain a substantial amount of a rare earth metal.

(A) The visible ray absorption spectrum measured in a chloroform or toluene solution of the organic dye has a main absorption peak (P) between 565 nm and 605 nm. The coefficient of absorption index (ml/g·cm) of the apex (Pmax: a point at which the coefficient of absorption is maximum) is $0.5 \times 10^5$ or more. The peak width at ¼ of the absorption at the apex (Pmax) of the peak (P) is 50 nm or less. In addition, the peak width at ½ of the absorption at the apex (Pmax) of the peak (P) is 30 nm or less, and the peak width at ⅔ of the absorption at the apex (Pmax) of the peak (P) is 20 nm or less.

The organic dye satisfying the above conditions (A) may be included only in the plastic lens wafer, or only in a hard coat layer, a primer layer, or another component layer formed on one side or both sides of the plastic lens wafer.

When there are two or more component layers, the organic dye may be included in at least one of the layers. The organic dye may also be included in both of the plastic lens wafer and the component layer. In this case, the apex (Pmax) of the main absorption peak (P) of the organic dye is preferably between 580 nm and 590 nm, as defined in claim 2. The peak width at ¼ of the absorption at the apex (Pmax) of the main absorption peak (P) may be 40 nm or less, the peak width at ½ of the absorption at the apex (Pmax) of the main peak (P) may be 25 nm or less, and the peak width at ⅔ of the absorption at the apex (Pmax) of the main peak (P) may 20 nm or less.

The wavelength position of the minimal value of the transmission in the transmission spectrum of the lens is preferably more than 585 nm but 600 nm or less, as defined in claim 3.

The organic dye may be a tetraazaporphyrin compound shown by the formula (1), as defined in claim 4.

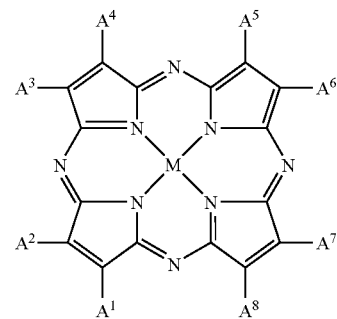

wherein $A^1$ to $A^8$ individually are a hydrogen atom, a halogen atom, a nitro group, a cyano group, a hydroxyl group, an amino group, a carboxyl group, a sulfonic acid group, a linear, branched, or cyclic alkyl group having 1 to 20 carbon atoms, an alkoxy group having 1 to 20 carbon atoms, an aryloxy group having 6 to 20 carbon atoms, a monoalkylamino group having 1 to 20 carbon atoms, a dialkylamino group having 2 to 20 carbon atoms, a dialkylamino group having 7 to 20 carbon atoms, an aralkyl group having 7 to 20 carbon atoms, an aryl group having 6 to 20 carbon atoms, a heteroaryl group, an alkylthio group having 6 to 20 carbon atoms, or an arylthio group having 6 to 20 carbon atoms, and may form a ring excluding an aromatic ring via a linkage group; and M represents two hydrogen atoms, a divalent metal atom, a divalent mono-substituted metal atom, a tetravalent di-substituted metal atom, or an oxy metal atom.

M may be a divalent copper atom as described in claim 5.

The tetraazaporphyrin compound may be a tetra-t-butyltetraazaporphyrin copper complex shown by the formula (2) as described in claim 6.

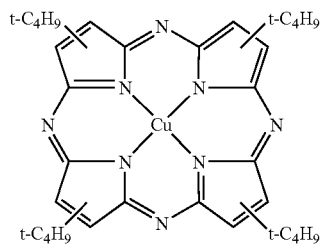

The formula (2) shows a position isomer structure, in which Cu indicates a divalent copper and t-$C_4H_9$ indicates a t-butyl group, and which may be located in any position from $A^1$ to $A^8$ of the formula (1).

The organic dye is previously incorporated in the plastic spectacles lens wafer as defined in claim 7, or the organic dye is previously incorporated and dispersed in substantially the entire area of the plastic lens wafer at a concentration of 0.0002 to 0.05 wt % of the plastic lens wafer, as defined in claim 8. Furthermore, the organic dye may be localized at a depth of 500 μm or less from at least one of the surfaces of the plastic lens wafer, as described in claim 9. Moreover, as described in claim 10, a component layer formed from a monolayer or a multilayer may be provided on at least one of the surfaces of the plastic lens wafer, at least one of the layers forming the component layer may contain an organic dye, and the concentration of the organic dye to the component layer may be 0.02 to 5 wt %.

The thermosetting resin may be a urethane thermosetting resin or a (meth)acrylate thermosetting resin as described in claim 11. The urethane thermosetting resin may be a thiourethane thermosetting resin made from polythiol as a monomer component or a urethane thermosetting resin made from polyol as a monomer component as described in claim 12.

The thermoplastic resin may be a polycarbonate resin or a polyamide resin as described in claim 13, and the thermoplastic resin may comprise 100 parts by weight of a polycarbonate resin and 0.5 to 30 parts by weight of a polyamide resin as described in claim 14.

In the component layers described in claim 1, at least one layer may be formed from an organic resin coating agent as described in claim 15. In this instance, the organic resin coating agent may be a thermoplastic organic resin coating agent or a thermosetting organic resin coating agent as described in claim 16. At least one layer forming the component layer may be a hard coat layer as described in claim 17, or at least one layer forming the component layer may be a primer layer which is in contract with the hard coat layer, as described in claim 18.

The invention described in claim 19 pertains to the plastic spectacles lens dyed with one or more organic dyes other than the organic dye satisfying the conditions (A). As specific examples of the dyed color, brown and gray can be given.

The invention described in claim 20 pertains to the plastic spectacles lens according to claim 12, wherein the thiourethane thermosetting resin is a resin obtained by the polymerization reaction of one, or two or more iso(thio)cyanate compounds (B) selected from a group consisting of a polyisocyanate compound, an isocyanate compound having an isothiocyanate group, and a polyisothiocyanate compound and an active hydrogen compound (C), wherein the active hydrogen compound (C) is one, or two or more thiol-type active hydrogen compounds (C1) selected from a group consisting of a thiol compound having a hydroxyl group and a polythiol compound or a hydroxyl group-type active hydrogen compound which has a hydroxyl group (C2).

In this instance, the iso(thio)cyanate compound (B) may be a diisocyanate compound and the active hydrogen compound (C) may be a polythiol compound as described in claim 21, and the iso(thio)cyanate compound (B) may be one, or two or more diisocyanate selected from a group consisting of 2,5-bis(isocyanatemethyl)bicyclo[2,2,1]-heptane, 2,6-bis(isocyanatemethyl)bicyclo[2,2,1]-heptane, and m-xylylenediisocyanate, and the active hydrogen compound (C) is one, or two or more polythiol compounds selected from a group consisting of pentaerythritoltetrakis(3-mercaptopropionate), 4-mercaptomethyl-1,8-dimercapto-3,6-dithiaoctane, 5,7-dimercaptomethyl-1,1'-mercapto-3,6,9-trithiaundecane, 4,7-dimercaptomethyl-1,1'-mercapto-3,6,9-trithiaundecane, 4,7-dimercaptomethyl-1,1'-mercapto-3,6,9-trithiaundecane, 4,8-dimercaptomethyl-1,1'-mercapto-3,6,9-trithiaundecane, 1,1,3,3-tetrakis(mercaptomethylthio)propane, 4,6-bis(mercaptomethylthio)-1,3-dithian, and 2-(2,2-bis(mercaptomethylthio)ethyl)-1,3-dithiethane, as described in claim 22.

The invention described in claim 23 pertains to the plastic spectacles lens according to claim 11, wherein the (meth)acrylate thermosetting resin is a resin obtained by the polymerization reaction of a (meth)acrylate monomer-containing composition comprising a mixture of 70 to 100 wt % of one, or two or more monomers selected from a group consisting of polyfunctional (meth)acrylates (D) and 0 to 30 wt % of one, or two or more monomers selected from a group consisting of a monofunctional or polyfunctional vinyl compound (E-1) which conjugates with an aromatic group and/or a monofunctional vinyl compound (E-2) which conjugates with a carbonyl group, as a main component.

According to the present invention, a plastic spectacles lens comprising a plastic lens wafer made from a specific thermosetting resin or a specific thermoplastic resin, which contains a specific organic dye having a light absorption peak which is selectively sharp at around a wavelength of 585 nm is provided. The specific organic dye provides the lens with an excellent dazzle-preventing effect and a contrast-increasing effect of the same degree as exhibited by a neodymium compound having the same sharp absorption peak, thereby ensuring excellent optical transmission and clear vision in the wavelength area other than near 585 nm due to the sharpness of the specific absorption peak. The lens exhibits an excellently-balanced dazzle-preventing effect and visibility, and can be easily provided with various color tones such as gray and brown. The organic dye can be incorporated in a wide variety of plastic spectacles lenses only in an extremely small amount which does not affect the mechanical characteristics of the lens. The plastic spectacles lens can be produced from an economically advantageous composition containing a neodymium substitute.

BRIEF DESCRIPTION OF THE DRAWINGS

FIG. 7 is a graph showing the spectral transmission rate of the lens produced in Example 7.

FIG. 8 is a graph showing the spectral transmission rate of the lens produced in Example 8.

DETAILED DESCRIPTION OF THE INVENTION AND PREFERRED EMBODIMENTS

Figure 1:
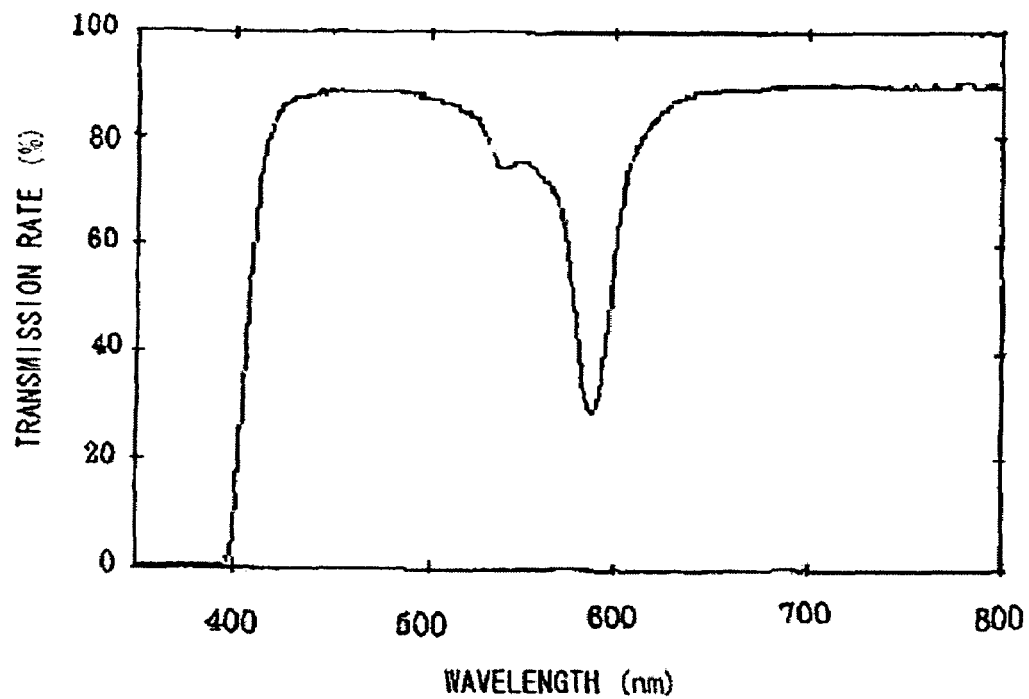
FIG. 1 is a graph showing the spectral transmission rate of the lens produced in Example 1.

A preferred embodiment of the present invention will be described in detail.

Thermosetting Resin

In carrying out the present invention, a step of polymerizing and molding a thermosetting plastic lens wafer material part forming the target plastic spectacles lens is included. When the plastic lens wafer material is a thermosetting resin, a method of polymerizing a monomer that produces the target polymer, and curing the polymer is generally employed. Although not particularly limited, casting polymerization is usually employed for the polymerization.

In this instance, a specific organic dye is added to the thermosetting resin-forming composition. The composition is charged to a cast molding die for a lens, in which the composition is polymerized and molded into a plastic spectacles lens. The method of feeding the thermosetting resin-forming composition to the cast molding die is not particularly limited. A method of charging through a small tube, for example, is used. The resin-forming composition may be previously defoamed under reduced pressure. The polymerization in the cast molding die may be carried out under conditions in which atmospheric environmental factors are substantially excluded.

The cast molding die for the lens of the present invention is generally formed from a pair of dies held by a gasket. As the material of the gasket, polymers such as polyvinyl chloride, an ethylene-vinyl acetate copolymer, an ethylene-ethylacrylate copolymer, an ethylene-propylene copolymer, an ethylene-propylene-diene copolymer, a polyurethane elastomer, and a fluororubber, or a soft elastic resin prepared by blending polypropylene with these polymers can be used. A material which neither swells nor elutes in the resin-forming composition containing the organic dye used in the present invention is preferable. As the material of the cast molding die, glass, a metal, and the like can be given, and glass is usually used. A parting agent may be applied to the cast molding die in order to improve the releasability of the resulting lens. It is also possible to apply a coating solution for providing the lens material with hard coat performance.

The present invention will now be specifically described according to the types of the thermosetting plastic from which the plastic lens wafer of the lens component is produced.

In the case in which such a thermosetting plastic is a thiourethane thermosetting resin (Ia), in which a polythiol is used as a monomer component, among the urethane thermosetting resins, an organic dye is added to a thiourethane resin produced by polymerizing an iso(thio)cyanate compound (B) and a thiol-type active hydrogen compound (C1) to obtain a thiourethane thermosetting resin composition containing an organic dye.

The iso(thio)cyanate compound (B) used in the present invention refers to one, or two or more iso(thio)cyanate compounds (B) selected from a group consisting of a polyisocyanate compound, an isocyanate compound which has an isothiocyanate group, and a polyisothiocyanate compound.

Polyisocyanate Compound

As examples of the polyisocyanate compound, aliphatic polyisocyanate compounds such as hexamethylene diisocyanate, 2,2,4-trimethylhexane diisocyanate, 2,4,4-trimethylhexamethylene diisocyanate, lysine diisocyanate methyl ester, lysine triisocyanate, m-xylylene diisocyanate, $\alpha,\alpha,\alpha',\alpha'$-tetramethylxylylene diisocyanate, bis(isocyanatemethyl)naphthalene, mesitylene triisocyanate, bis(isocyanatemethyl)sulfide, bis(isocyanatethyl)sulfide, bis(isocyanatemethyl)disulfide, bis(isocyanatethyl)disulfide, bis(isocyanatemethylthio)methane, bis(isocyanatethylthio)methane, bis(isocyanatethylthio)ethane, and bis(isocyanatemethylthio)ethane; alicyclic polyisocyanate compounds such as isophorone diisocyanate, bis(isocyanatemethyl)cyclohexane, dicyclohexylmethane diisocyanate, cyclohexane diisocyanate, methylcyclohexane diisocyanate, dicyclohexyldimethylmethane isocyanate, 2,5-bis(isocyanatemethyl)bicyclo[2.2.1]-heptane, 2,6-bis(isocyanatemethyl)bicyclo[2.2.1]-heptane, 3,8-bis(isocyanatemethyl)tricyclodecane, 3,9-bis(isocyanatemethyl)tricyclodecane, 4,8-bis(isocyanatemethyl)tricyclodecane, and 4,9-bis(isocyanatemethyl)tricyclodecane; aromatic polyisocyanate compounds such as phenylene diisocyanate, tolylene diisocyanate, 4,4-diphenylmethane diisocyanate, and diphenyl sulfide-4,4-diisocyanate; and heterocyclic polyisocyanate compounds such as 2,5-diisocyanate thiophene, 2,5-bis(isocyanatemethyl)thiophene, 2,5-diisocyanate tetrahydrothiophene, 2,5-bis(isocyanatemethyl)tetrahydrothiophene, 3,4-bis(isocyanatemethyl)tetrahydrothiophene, 2,5-diisocyanate-1,4-dithian, 2,5-bis(isocyanatemethyl)-1,4-dithian, 4,5-diisocyanate-1,3-dithiolan, 4,5-bis(isocyanatemethyl)-1,3-dithiolan can be given. The polyisocyanate compound is not limited to these examples.

Isocyanate Compound having an Isothiocyanate Group

Although not particularly limited, a compound in which a part of the isocyanate group of the polyisocyanate compound given above is replaced with an isothiocyanate group can be given as an example of the isocyanate compound having an isothiocyanate group.

Polyisothiocyanate Compound

As examples of the polyisothiocyanate compound, aliphatic polyisothiocyanate compounds such as hexamethylene diisothiocyanate, lysine diisothiocyanate methyl ester, lysine triisothiocyanate, m-xylylene diisothiocyanate, bis(isothiocyanatemethyl)sulfide, bis(isothiocyanateethyl)sulfide, and bis(isothiocyanateethyl)disulfide; alicyclic polyisothiocyanate compounds such as isophorone diisothiocyanate, bis(isothiocyanatemethyl)cyclohexane, dicyclohexylmethane diisothiocyanate, cyclohexane diisothiocyanate, methyl cyclohexane diisothiocyanate, 2,5-bis(isothiocyanatemethyl)bicyclo[2.2.1]-heptane, 2,6-bis(isothiocyanatemethyl)bicyclo[2.2.1]-heptane, 3,8-bis(isothiocyanatemethyl)tricyclodecane, 3,9-bis(isothiocyanatemethyl)tricyclodecane, 4,8-bis(isothiocyanatemethyl)tricyclodecane, and 4,9-bis(isothiocyanatemethyl)tricyclodecane; aromatic polyisothiocyanate compounds such as tolylene diisothiocyanate, 4,4-diphenylmethane diisothiocyanate, and diphenyl disulfide-4,4-diisothiocyanate; and sulfur-containing heterocyclic polyisothiocyanate compounds such as 2,5-diisothiocyanate thiophene, 2,5-bis(isothiocyanatemethyl)thiophene, 2,5-diisothiocyanate tetrahydrothiophene, 2,5-bis(isothiocyanatemethyl)tetrahydrothiophene, 3,4-bis(isothiocyanatemethyl)tetrahydrothiophene, 2,5-diisothiocyanate-1,4-dithian, 2,5-bis(isothiocyanatemethyl)-1,4-dithian, 4,5-diisothiocyanate-1,3-dithiolan, and 4,5-bis(isothiocyanatemethyl)-1,3-dithiolan can be given. The polyisothiocyanate compound is not limited to these examples.

Derivatives of these iso(thio)cyanate compounds (B), such as a halogen-substituted compound such as a chlorine-substituted compound and a bromine-substituted compound, an alkyl group-substituted compound, an alkoxy group-substituted compound, a nitro group-substituted compound, a prepolymer-type modified product with a polyhydric alcohol, a carbodiimide-modified compound, an urea-modified compound, a biuret-modified compound, a dimerized or trimerized reaction compound, and the like can also be used. These ester compounds may be used either individually or in combination of two or more.

Among these iso(thio)cyanate compounds (B), a diisocyanate compound is preferably used because of its availability, the price, and capability of the resin produced from the diisocyanate compound. For examples, hexamethylene diisocyanate, isophorone diisocyanate, bis(isocyanatemethyl)cyclohexane, dicyclohexylmethane diisocyanate, 2,5-bis(isocyanatemethyl)bicyclo[2.2.1]-heptane, 2,6-bis(isocyanatemethyl)bicyclo[2.2.1]-heptane, m-xylylene diisocyanate, and 2,5-bis(isocyanatemethyl)-1,4-dithian are preferably used, with 2,5-bis(isocyanatemethyl)bicyclo[2.2.1]-heptane, 2,6-bis(isocyanatemethyl)bicyclo[2.2.1]-heptane, and m-xylylene diisocyanate being particularly preferable.

The active hydrogen compound (C) used in the present invention is one or more thiol-type active hydrogen compounds (C1) selected from a group consisting of a thiol compound having a hydroxyl group and a polythiol compound or a hydroxyl group-type active hydrogen compound which has a hydroxyl group (C2).

Although not particularly limited, 2-mercaptoethanol, 3-mercapto-1,2-propanediol, glycerindi(mercaptoacetate), 4-mercaptophenol, 2,3-dimercapto-1-propanol, pentaerythritol tris(3-mercaptopropionate), and pentaerythritol tris(thioglycolate) can be given as examples of the thiol compound having a hydroxyl group among the thiol-type active hydrogen compounds (C1).

Among the thiol-type active hydrogen compounds (C1), examples of the polythiol compounds include, but are not limited to, aliphatic polythiol compounds such as methanedithiol, 1,2-ethanedithiol, 1,2,3-propanetrithiol, 1,2-cyclohexanedithiol, bis(2-mercaptoethyl)ether, tetrakis(mercaptomethyl)methane, diethylene glycol bis(2-mercaptoacetate), diethylene glycol bis(3-mercaptopropionate), ethylene glycol bis(2-mercaptoacetate), ethylene glycol bis(3-mercaptopropionate), trimethylolpropane tris(2-mercaptoacetate), trimethylolpropane tris(3-mercaptopropionate), trimethylolethane tris(2-mercaptoacetate), trimethylolethane tris(3-mercaptopropionate), pentaerythritol tetrakis(2-mercaptoacetate), pentaerythritol tetrakis(3-mercaptopropionate), bis(mercaptomethyl)sulfide, bis(mercaptomethyl)disulfide, bis(mercaptoethyl)sulfide, bis(mercaptoethyl)disulfide, bis(mercaptopropyl)sulfide, bis(mercaptomethylthio)methane, bis(2-mercaptoethylthio)methane, bis(3-mercaptopropylthio)methane, 1,2-bis(mercaptomethylthio)ethane, 1,2-bis(2-mercaptoethylthio)ethane, 1,2-bis(3-mercaptopropylthio)ethane, 1,2,3-tris(mercaptomethylthio)propane, 1,2,3-tris(2-mercaptoethylthio)propane, 1,2,3-tris(3-mercaptopropylthio)propane, 4-mercaptomethyl-1,8-dimercapto-3,6-dithiaoctane, 5,7-dimercaptomethyl-1,1'-mercapto-3,6,9-trithiaundecane, 4,7-dimercaptomethyl-1,1'-mercapto-3,6,9-trithiaundecane, 4,8-dimercaptomethyl-1,11-mercapto-3,6,9-trithiaundecane, tetrakis(mercaptomethylthiomethyl)methane, tetrakis(2-mercaptoethylthiomethyl)methane, tetrakis(3-mercaptopropylthiomethyl)methane, bis(2,3-dimercaptopropyl)sulfide, 2,5-dimercaptomethyl-1,4-dithiane, 2,5-dimercapto-1,4-dithiane, and 2,5-dimercaptomethyl-2,5-dimethyl-1,4-dithiane; esters of thioglycolic acid and mercaptopropionic acid of the compounds given above, hydroxymethylsulfide bis(2-mercaptoacetate), hydroxymethylsulfide bis(3-mercaptopropionate), hydroxyethylsulfide bis(2-mercaptoacetate), hydroxyethylsulfide bis(3-mercaptopropionate), hydroxymethyldisulfide bis(2-mercaptoacetate), hydroxymethyldisulfide bis(3-mercaptopropionate), hydroxyethyldisulfide bis(2-mercaptoacetate), hydroxyethyldisulfide bis(3-mercaptopropionate), 2-mercaptoethyl ether bis(2-mercaptoacetate), 2-mercaptoethyl ether bis(3-mercaptopropionate), thiodiglycolic acid bis(2-mercaptoethyl ester), thiodipropionic acid bis(2-mercaptoethyl ester), dithiodiglycolic acid bis(2-mercaptoethyl ester), dithiodipropionic acid bis(2-mercaptoethyl ester), 1,1,3,3-tetrakis(mercaptomethylthio)propane, 1,1,2,2-tetrakis(mercaptomethylthio)ethane, 4,6-bis(mercaptomethylthio)-1,3-dithiacyclohexane, tris(mercaptomethylthio)methane, and tris(mercaptoethylthio)methane; aromatic polythiol compounds such as 1,2-dimercaptobenzene, 1,3-dimercaptobenzene, 1,4-dimercaptobenzene, 1,2-bis(mercaptomethyl)benzene, 1,3-bis(mercaptomethyl)benzene, 1,4-bis(mercaptomethyl)benzene, 1,2-bis(mercaptoethyl)benzene, 1,3-bis(mercaptoethyl)benzene, 1,4-bis(mercaptoethyl)benzene, 1,3,5-trimercaptobenzene, 1,3,5-tris(mercaptomethyl)benzene, 1,3,5-tris(mercaptomethyleneoxy)benzene, 1,3,5-tris(mercaptoethyleneoxy)benzene, 2,5-toluenedithiol, 3,4-toluenedithiol, 1,5-naphthalenedithiol, and 2,6-naphthalenedithiol; and heterocyclic thiol compounds such as 2-methylamino-4,6-dithiol-sym-triazine, 3,4-thiophenedithiol, bismuthiol, 4,6-bis(mercaptomethylthio)-1,3-dithiane, and 2-(2,2-bis(mercaptomethylthio)ethyl)-1,3-dithietan.

Oligomers of these thiol-type active hydrogen compounds (C1), a halogen-substituted compound such as a chlorine-substituted compound and a bromine-substituted compound can also be used. These active hydrogen compounds may be used either individually or in combination of two or more.

Among these thiol-type active hydrogen compounds (C1), a polythiol compound is preferably used because of its availability, price, and capability of the resin produced from the polythiol compound.

For examples, pentaerythritol tetrakis(2-mercaptoacetate), pentaerythritol tetrakis(3-mercaptopropionate), bis(mercaptoethyl)sulfide, 4-mercaptomethyl 1,8-dimercapto-3,6-dithiaoctane, 5,7-dimercaptomethyl-1,1'-mercapto-3,6,9-trithiaundecane, 4,7-dimercaptomethyl-1,1'-mercapto-3,6,9-trithiaundecane, 4,8-dimercaptomethyl-1,1'-mercapto-3,6,9-trithiaundecane, 2,5-dimercaptomethyl-1,4-dithian, 1,1,3,3-tetrakis(mercaptomethylthio)propane, 4,6-bis(mercaptomethylthio)-1,3-dithian, and 2-(2,2-bis(mercaptomethylthio)ethyl)-1,3-dithiethane are preferable, and pentaerythritol tetrakis(3-mercaptopropionate), 4-mercaptomethyl-1,8-dimercapto-3,6-dithiaoctane, 5,7-dimercaptomethyl-1,1'-mercapto-3,6,9-trithiaundecane, 4,7-dimercaptomethyl-1,1'-mercapto-3,6,9-trithiaundecane, 4,8- dimercaptomethyl-1,1'-mercapto-3,6,9-trithiaundecane, 1,1,3,3-tetrakis(mercaptomethylthio)propane, 4,6-bis(mercaptomethylthio)-1,3-dithian, and 2-(2,2-bis(mercaptomethylthio)ethyl)-1,3-dithiethane are particularly preferable.

When the thermosetting plastic from which the plastic lens wafer of the present invention is produced is the urethane thermosetting resin made from a polyol as a monomer component, the urethane thermosetting resin-forming composition containing an organic dye is produced by adding the organic dye to the urethane resin formed by the polymerization reaction of the iso(thio)cyanate compound (B) and the hydroxyl group-type active hydrogen compound (C2).

The hydroxyl group-type active hydrogen compound (C2) is one or more active hydrogen compounds selected from the compounds containing hydroxyl groups.

As examples of the compounds containing hydroxyl groups, a compound containing two or more hydroxyl groups such as ethylene glycol, diethylene glycol, triethylene glycol, polyethylene glycol, propylene glycol, dipropylene glycol, polypropylene glycol, butylene glycol, glycerol, diglycerol, trimethylolethane, trimethylolpropane, 1,2-methyl glicocid, pentaerythritol, dipentaerythritol, tripentaerythritol, sorbitol, erythritol, mannitol, hexanetriol, tris(2-hydroxyethyl)isocyanurate, tris(2-hydroxypropyl)isocyanurate, cyclopentanediol, cyclohexanediol, cyclohexanedimethanol, hydroxypropyl cyclohexanol, norbornanediol, norbornanedimethanol, tricyclo(5,2,1,0$^{2,6}$)diol, tricyclo(5,2,1,0$^{2,6}$)dimethanol, dihydroxy benzene, benzenetriol, bisphenol A, bisphenol F, totally hydrogenated bisphenol A, totally hydrogenated bisphenol F, propylene glycol ether of bisphenol A, dipropylene glycol ether, polyethylene glycol ether, propylene glycol ether, dipropylene glycol ether, polypropylene glycol ether, propylene glycol ether of bisphenol F, dipropylene glycol ether, polyethylene glycol ether, propylene glycol ether, dipropylene glycol ether, polypropylene glycol ether, glycolic-acid ester of trimethylolpropane, and 2-hydroxypropionate can be given.

The iso(thio)cyanate compound (B) used in the present invention may be previously reacted with a part of the active hydrogen compound (C), or the active hydrogen compound (C) used in the present invention may be previously reacted with a part of the iso(thio)cyanate compound (B).

To an extent not impairing the scope of the present invention, a general resin modifier such as a hydroxyl compound, an epoxy compound, an episulfide compound, an organic acid, an acid anhydride, an olefin compound such as a (meth)acrylate compound, and the like may be used in combination with the iso(thio)cyanate compound (B) and the active hydrogen compound (C) to adjust or improve the properties such as refractive index, Abbe's number, heat resistance, and specific gravity and mechanical strength such as impact resistance.

In addition to the iso(thio)cyanate compound (B) and the thiol-type active hydrogen compound (C1) forming the thiourethane thermosetting resin (Ia) or the iso(thio)cyanate compound (B) and the hydroxyl group-type active hydrogen compound (C2) forming the iso(thio)cyanate thermosetting resin (Ib), a general resin modifier may be used in combination in order to adjust or improve the properties such as refractive index, Abbe's number, heat resistance, and specific gravity and mechanical strength such as impact resistance to an extent not impairing the scope of the present invention. As examples of such a resin modifier, a hydroxyl compound, a thiol compound, an epoxy compound, an episulfide compound, an organic acid, an organic acid anhydride, an olefinic compound such as a (meth)acrylate compound, and the like can be given.

The ratio of the iso(thio)cyanate compound (B) and the thiol-type active hydrogen compound (C1) (including the hydroxyl compound of the modifier) or the ratio of the iso(thio)cyanate compound (B) and the hydroxyl group-type active hydrogen compound (C2) (including the thiol compound of the modifier), in terms of the functional group molar ratio (NCO+NCS)/(SH+OH), is usually in the range of 0.8 to 1.5, preferably 0.9 to 1.2, and more preferably 1.0 (equivalent).

The mixture of the iso(thio)cyanate compound (B) and the thiol-type active hydrogen compound (C1) or the mixture of the iso(thio)cyanate compound (B) and the hydroxyl group-type active hydrogen compound (C2) is used after the addition of the organic dye of the present invention according to the method described later. When the mixture is polymerized, materials such as a catalyst such as butyltin dichloride, a UV absorber, an internal parting agent such as acid phosphate, a photostabilizer, an antioxidant, a reaction initiator such as a radical reaction initiator, a chain extension agent, a crosslinking agent, a filler, and the like may be added according to a common forming method.

The urethane thermosetting resin composition used for the above polymerization is poured in a lens cast molding die, for example. The cast molding die is heated in an apparatus which can be heated in an oven or in water according to a prescribed temperature program for several hours to several tens of hours to polymerize and cure the resin, and mold the resin into a plastic spectacles lens.

Although the polymerization and curing temperature may vary according to the conditions such as the mixture composition, the type of catalyst, the mold die configuration, and the like, the heating temperature is about −50° C. to 200° C. and the heating time is 1 to 100 hours.

In general, the curing and molding operation is initiated at 5° C. to 40° C. Then, the mold die is gradually heated to a temperature in a range from 80° C. to 130° C., at which temperature the mold die is heated from one hour to four hours. After completion of curing and molding, the product is removed from the lens cast molding die to obtain a plastic spectacles lens made of the urethane thermosetting resin (1a) or (1b) of the present invention.

In order to correct distortion during polymerization, the plastic lens of the present invention is preferably annealed by heating after parting from the cast molding die. The annealing point is usually 80 to 150° C., preferably 100 to 130° C., and more preferably 110 to 125° C. The annealing time is usually from 0.5 to 5 hours, and preferably from 1 to 3 hours.

When the thermosetting resin that forms the plastic lens wafer of the present invention is (II) a (meth)acrylic thermosetting resin, the (meth)acrylic thermosetting resin is obtained by polymerizing a (meth)acrylate monomer composition which comprises 70 to 100 wt % of one, or two or more monomers selected from a group consisting of polyfunctional (meth)acrylate (D) monomers and 0 to 30 wt % of a monofunctional or polyfunctional vinyl compound (E-1) conjugated with an aromatic group and/or a monofunctional vinyl compound (E-2) conjugated with a carbonyl group. An organic dye is added to the resulting (meth)acrylic thermosetting resin to obtain an organic dye-containing (meth)acrylic thermosetting resin composition. The component (E-1) and component (E-2) may be included as required. The term "(meth)acrylic acid" used in the present invention refers to "acrylic acid or methacrylic acid" and "(meth)acrylate" refers to "acrylate or (meth)acrylate".

The polyfunctional (meth)acrylate (D) used in the present invention includes polyol (meth)acrylates, urethane (meth)acrylates, epoxy (meth)acrylates, and the like. The (meth)

acrylic resin which forms the plastic lens wafer of the present invention comprises polyol (meth)acrylates as major components and urethane (meth)acrylates, epoxy (meth)acrylates, and the like, as required.

As examples of the polyol (meth)acrylates which are polyfunctional (meth)acrylates (D) of the present invention, aliphatic di(meth)acrylates such as ethylene glycol di(meth)acrylate, diethylene glycol di(meth)acrylate, triethylene glycol di(meth)acrylate, polyethylene glycol di(meth)acrylate, propylene glycol di(meth)acrylate, dipropyrene glycol di(meth)acrylate, tripropylene glycol di(meth)acrylate, polypropylene glycol di(meth)acrylate, 1,4-butanediol di(meth)acrylate, 1,6-hexanediol di(meth)acrylate, pentaerythritol di(meth)acrylate, and glycerine di(meth)acrylate; aromatic di(meth)acrylates such as 2,2-bis[4-(meth)acryloyloxyphenyl]propane, 2,2-bis[4-(meth)acryloyloxyethoxyphenyl]propane, 2,2-bis[4-(meth)acryloyloxydiethoxyphenyl]propane, 2,2-bis[4-(meth)acryloyloxypropyloxyphenyl]propane, 2,2-bis[4-(meth)acryloyloxydipropyloxyphenyl]propane, 2,2-bis[4-(meth)acryloyloxypolyethoxyphenyl]propane, 2,2-bis[4-(meth)acryloyloxypolypropyloxyphenyl]propane, and 2,2-bis[4-(meth)acryloyloxy-(2'-hydroxypropyloxy)phenyl] propane; tri(meth)acrylates such as trimethylolpropane tri(meth)acrylate, pentaerythritol tri (meth)acrylate, and glycerol tri(meth)acrylate; and polyfunctional (meth)acrylates in which four or more (meth)acrylic groups are substituted such as pentaerythritol tetra(meth)acrylate derivatives, and dipentaerythritol penta(meth)acrylate; and the like can be given.

The urethane (meth)acrylates in the present invention is an addition reaction product of a polyisocyanate and a (meth)acrylate having a hydroxyl group. As examples of the polyisocyanates, tolylene-2,4-diisocyanate, m-xylylenediisocyanate, diphenylmethane diisocyanate, hexamethylene diisocyanate, isophorone diisocyanate, and the like can be given.

As examples of the (meth)acrylates having a hydroxyl group, 2-hydroxyethyl (meth)acrylate, 2-hydroxypropyl (meth)acrylate, hydroxybutyl (meth)acrylate, 2-hydroxy-3-phenoxypropyl (meth)acrylate, pentaerythritol tri(meth) acrylate, and the like can be given. "NK oligo U series" manufactured by Shin-Nakamura Chemicals Co., Ltd., "ARONIX M series" manufactured by Toagosei Co., Ltd., and the like are available as commercial products.

The epoxy (meth)acrylates in the present invention have a structure in which a polyepoxy compounds are added to a (meth)acrylate. As examples of the polyepoxy compounds, a reaction product of bisphenol A and epichlorohydrin, a reaction product of phenol novolak and epichlorohydrin, and the like can be given. "NK oligo EMA series" and "NK oligo EA series" manufactured by Shin-Nakamura Chemicals Co., Ltd., and the like are available as commercial products.

As examples of the monofunctional or polyfunctional vinyl compound (E-1) monomers which conjugate with an aromatic group used in the present invention, styrene; nucleus-substituted styrenes such as methylstyrene, ethylstyrene, dimethylstyrene, chlorostyrene, dichlorostyrene, bromostyrene, and p-chloromethylstyrene; monofunctional vinyl compounds such as á-methylstyrene, polyfunctional vinyl compounds such as divinylbenzene and divinylbiphenyl; and the like can be given.

As examples of the monofunctional vinyl compounds (E-2) monomers which conjugate with a carbonyl group used in the present invention, (meth)acrylates such as methyl (meth)acrylate, ethyl (meth)acrylate, n-butyl (meth)acrylate, ethylhexyl (meth)acrylate, benzyl (meth)acrylate, phenyl (meth)acrylate, cyclohexyl (meth)acrylate, isobornyl (meth) acrylate, and adamantyl (meth)acrylate; 2-hydroxyethyl (meth)acrylate, 2-hydroxypropyl (meth)acrylate, hydroxybutyl (meth)acrylate, 2-hydroxy-3-phenoxypropyl (meth) acrylate, 3-acryloyloxy glycerol monomethacrylate, (meth) acrylic acid amide, N,N-dimethyl(meth)acrylic acid amide, N,N-diethyl(meth) acrylic acid amide, N-isopropyl (meth) acrylic acid amide, and the like can be given.

Oligomers produced by the polymerization of radical polymerizable monomers of the above-mentioned the polyfunctional (meth)acrylate (D), monofunctional or polyfunctional vinyl compound (E-1) which conjugates with an aromatic group, and monofunctional vinyl compound (E-2) which conjugates with a carbonyl group can also be given as the polymerizable monomer component.

As an initiator used in the polymerization reaction of the (meth)acrylic resin composition in the present invention, an azo compound or an organic peroxide can be used. The azo compounds and the organic peroxides may be used either alone or in combination of two or more.

As examples of the azo compounds, 2,2'-azobis(2,4-dimethylvaleronitrile), 2,2'-azobisisobutylonitrile, 2,2'-azobis(2-methylbutyronitrile), 1,1'-azobis(cyclohexane-1-carbonitrile), dimethyl(2,2'-azobisisobutyrate), and the like can be given.

As examples of the organic peroxides, benzoyl peroxide, diisopropyl peroxydicarbonate, di-n-propyl peroxydicarbonate, bis(4-t-butylcyclohexyl) peroxydicarbonate, t-butylperoxyisopropyl carbonate, t-butylperoxybenzoate, 1,1-bis(t-butylperoxy)-3,3,5-trimethylcyclohexane, and the like can be given. Since the monomer mixture containing an organic dye is polymerized in the present invention, the azo compound initiator may be preferred over the organic peroxide initiator in some cases in order to suppress deterioration of the organic dye in the polymerization initiator. The amount of the polymerization initiator used is preferably in a range from 0.001 to 5 wt %, and more preferably from 0.1 to 4 wt % of the (meth)acrylate monomer compositions.

The (meth)acrylate monomer mixture containing the polymerization initiator is used after adding the organic dye of the present invention according to the method described later. When the mixture is polymerized, materials such as a thermal stabilizer, a UV absorber, an infrared absorber, an antioxidant, a photostabilizer, a parting agent, an antistatic agent, a filler, and the like may be added in accordance with a common forming method.

The (meth)acrylic resin composition used for the above polymerization is poured into a lens cast molding die, for example. The cast molding die is heated in an apparatus which can be heated in an oven or in water according to a prescribed temperature program, to polymerize and cure the resin. The heating temperature and heating time significantly differ according to the initiator used. Usually, the cast molding die is heated at 20 to 130° C. for 5 to 48 hours.

Since the molded product obtained by parting from the die after thermosetting has an internal distortion, the product is preferably annealed. The annealing temperature is preferably 100 to 140° C., more preferably 110 to 130° C., and the annealing time is preferably 30 minutes or more and less than 6 hours, and more preferably 1 to 4 hours.

Thermoplastic Resin

A thermoplastic resin can be used as a plastic lens wafer material.

A polycarbonate resin or a polyamide resin can be used as the thermoplastic resin. These resins may be used either individually or in combination of two or more. For example, a thermoplastic resin containing 0.5 to 30 parts by weight, preferably 1 to 20 parts by weight, and more preferably 2 to 15 parts by weight of a polyamide resin for 100 parts by weight of a polycarbonate resin can be used.

Polycarbonate Resin

Polycarbonate resin (III) is a polymer obtained by a phosgene method in which a dihydroxy diaryl compound and a phosgene compound are reacted or a transesterification method in which a dihydroxy diaryl compound and a carbonate such as a diphenyl carbonate are reacted, as major methods. As a typical example, a polycarbonate resin produced from 2,2-bis(4-hydroxyphenyl)propane(bisphenol A) can be given.

As examples of the dihydroxydiaryl compounds, in addition to bisphenol A, (hydroxyaryl)alkanes such as bis(4-hydroxyphenyl)methane, 1,1-bis(4-hydroxyphenyl)ethane, 2,2-bis(4-hydroxyphenyl)butane, 2,2-bis(4-hydroxyphenyl)octane, 2,2-bis(4-hydroxyphenyl)phenylmethane, 2,2-bis(4-hydroxy-3-methylphenyl)propane, 2,2-bis(4-hydroxy-3-t-butylphenyl)propane, 1,1-bis(4-hydroxy-3-t-butylphenyl)propane, 2,2-bis(4-hydroxy-3-bromophenyl)propane, 2,2-bis(4-hydroxy-3,5-dibromophenyl)propane, and 2,2-bis(4-hydroxy-3,5-dichlorophenyl) propane; (hydroxyaryl)cycloalkanes such as 1,1-bis(4-hydroxyphenyl)cyclopentane and 1,1-bis(4-hydroxyphenyl)cyclohexane; dihydroxydiaryl ethers such as 4,4'-dihydroxydiphenyl ether and 4,4'-dihydroxy-3,3'-dimethyldiphenyl ether; dihydroxydiaryl sulfides such as 4,4'-dihydroxydiphenyl sulfide; dihydroxydiaryl sulfoxides such as 4,4'-dihydroxydiphenyl sulfoxide and 4,4'-dihydroxy-3,3'-dimethyldiphenyl sulfoxide; dihydroxydiaryl sulfones such as 4,4'-dihydroxydiphenyl sulfone and 4,4'-dihydroxy-3,3'-dimethyldiphenyl sulfone, and the like can be given.

These dihydroxydiaryl compounds may be used either individually or in combination of two or more. In addition, piperazine, piperidyl hydroquinone, resorcin, 4,4'-dihydroxydiphenyl, and the like may be used together with these compounds.

Furthermore, these dihydroxyaryl compounds may be used together with a tri- or higher valent phenolic compound. As examples of the trivalent phenolic compound, phloroglucin, 1,3,5-tri(4-hydroxyphenyl)benzole, 1,1,1-tri(4-hydroxyphenyl)ethane, and the like can be given.

The viscosity average molecular weight of the polycarbonate resin is usually 10,000 to 100,000, and preferably 10,000 to 400,000.

Polyamide Resin

Polyamide resin (IV) is a resin having a structure of a dehydration-polycondensation compound of a diamine compound containing an aromatic or aliphatic group and a dicarboxylic acid compound containing an aromatic or aliphatic group. The term "aliphatic group" referred to herein includes an alicyclic aliphatic group. The above resin having a structure of a dehydration-polycondensation compound of a diamine compound and a dicarboxylic acid compound is not necessarily limited to the compound obtained by a dehydration-polycondensation reaction, but includes, for example, a compound obtained by a ring-opening polymerization of one, or two or more lactam compounds.

As the diamine compounds, hexamethylenediamine, m-xylylenediamine, bis(4-aminocyclohexyl)methane, bis(4-amino-3-methylcyclohexyl)methane, trimethylhexamethylenediamine, bis(aminomethyl)norbornane, bis(aminomethyl)tetrahydrodicyclopentadiene, and the like can be given. One, or two or more diamines are selected from these diamine compounds.

As the dicarboxylic acid compounds, adipic acid, dodecane dicarboxylic acid, isophthalic acid, terephthalic acid, bis(hydroxycarbonylmethyl)norbornane, bis(hydroxycarbonylmethyl)tetrahydrodicyclopentadiene, and the like can be given. One, or two or more dicarboxylic acid are selected from these dicarboxylic acid compounds.

An amorphous polyamide resin, which is generally called transparent nylon, is particularly preferable from the viewpoint of transparency. For example, "Grilamid TR-55", "Grilamid TR-90", and "Grilamid TR-XE3805" manufactured by EMS Chemie AG, "Trogamid CX 7323" manufactured by Huels AG, and the like can be given.

When the plastic lens wafer material is a thermoplastic resin, a general method such as compression molding, transfer molding, injection molding, compression-injection molding, or the like can be used. That is, a method of heating the thermoplastic resin to a temperature higher than the melting point, introducing the resin to a cast molding die having the form of the target plastic lens wafer, and cooling to solidify to obtain a plastic lens wafer is employed. An inserting method of previously placing a plastic film having an objective function such as a polarization film in the die and integrating this functional plastic film with the plastic lens wafer is within the scope of the present invention.

In this case, one, or two or more specific organic dyes are previously added to the supplied thermoplastic resin. Although there are no particular limitations to the method of incorporating the organic dye in the thermoplastic resin, a method of causing a powder of the specific organic dye to adhere to the surface of pellets of the thermoplastic resin by mixing the powder and pellets at a temperature below the melting point of the pellets can be given as an example. As another method, it is possible to incorporate the specific organic dye in the thermoplastic resin pellets by kneading the powder and pellets at a temperature above the melting point of the pellets using an appropriate kneader.

The thermoplastic resin charged to the cast molding die may be previously subjected to a drying treatment under general conditions to reduce the water content, as required.

Organic Dye

The organic dye of the present invention is oil soluble and must satisfy the following conditions. The visible ray absorption spectrum measured in a chloroform or toluene solution of the organic dye must have a main absorption peak (P) between 565 nm and 605 nm. The coefficient of absorption index (ml/g·cm) of the apex (Pmax: a point at which the coefficient of absorption is maximum) must be $0.5 \times 10^5$ or more. The peak width at ¼ of the absorption at the apex (Pmax) of the peak (P) must be 50 nm or less. In addition, the peak width at ½ of the absorption at the apex (Pmax) of the peak (P) must be 30 nm or less, and the peak width at ⅔ of the absorption at the apex (Pmax) of the peak (P) must be 20 nm or less. The organic dye is preferably localized at a depth of 500 μm or less from at least one of the surfaces of the plastic lens wafer.

In the above visible ray absorption spectrum, it is needless to specifically explain the case in which the absorption peak (P) between 565 nm and 605 nm is a single peak substantially having no side peaks, but there are frequently cases in which a side peak overlapping with the main peak is observed. In such a case, it is possible to specify the main absorption peak (P) existing between 565 nm and 605 nm first, and to diagrammatically identify the peak width of the measured main peak including the side peak without processing the side peak overlapping with the main peak by a peak separation analysis and the like.

As examples of such an organic dye, a tetraazaporphyrin compound shown by the formula (1) can be given. In the formula (1), M is preferably a divalent copper. As a specific compound, a tetra-t-butyltetraazaporphyrin copper complex shown by the formula (2) can be given. This compound is available as "PD-311S" manufactured by Mitsui Chemicals, Inc.

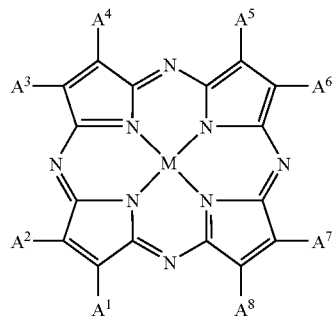

wherein $A^1$ to $A^8$ individually are a hydrogen atom, a halogen atom, a nitro group, a cyano group, a hydroxyl group, an amino group, a carboxyl group, a sulfonic acid group, a linear, branched, or cyclic alkyl group having 1 to 20 carbon atoms, an alkoxy group having 1 to 20 carbon atoms, an aryloxy group having 6 to 20 carbon atoms, a monoalkylamino group having 1 to 20 carbon atoms, a dialkylamino group having 2 to 20 carbon atoms, a dialkylamino group having 7 to 20 carbon atoms, a diaralkyl group having 7 to 20 carbon atoms, an aralkyl group having 7 to 20 carbon atoms, an aryl having 6 to 20 carbon atoms, a heteroaryl group, an alkylthio group having 6 to 20 carbon atoms, or an arylthio group having 6 to 20 carbon atoms, and may form a ring excluding an aromatic ring via a linkage group; and M represents two hydrogen atoms, a divalent metal atom, a divalent mono-substituted metal atom, a tetravalent di-substituted metal atom, or an oxy metal atom.

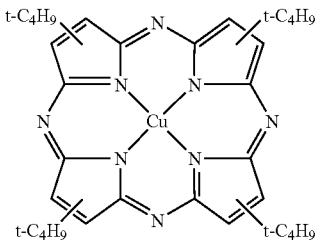

wherein Cu indicates a divalent copper and $t\text{-}C_4H_9$ indicates a t-butyl group which may be located in any position of $A^1$ to $A^8$ of the formula (1) to form a position isomer structure.

From the viewpoint of dazzle-preventing performance and capability of producing various color tone mixtures, the wavelength position of the minimum transmission rate in the transmission spectrum of the spectacles lens containing the organic dye of the present invention is more preferably in a range of 586 nm to 600 nm.

Mixing Organic Dye with Thermosetting Resin

The concentration of the organic dye in the plastic lens wafer of the thermosetting plastic spectacles lens of the present invention is in a range of 0.0002 wt % to 0.05 wt %, preferably 0.0002 wt % to 0.01 wt %, and more preferably 0.0004 wt % to 0.01 wt %. In order to obtain a mixture having a concentration in this range, the amount of organic dye added to the thermosetting resin composition can be easily determined by experiment based on the standard that the concentration is usually roughly the same as the target concentration of the plastic lens wafer.

The method for incorporating the organic dye in the thermoplastic resin composition will now be specifically described. The thermoplastic resin composition to be subjected to polymerization and curing mainly comprises a monomer mixture, an organic dye, a catalyst, and other additives (F).

When the object to be mixed with the organic dye of the present invention is liquid at a temperature of 0° C. or higher, the method of mixing is appropriately selected without a particular limitation, taking operability, safety, convenience, and the like into consideration.

For example, a method of producing a monomer composition by first mixing the organic dye with any monomer from among the monomers which constitute the monomer mixture, and adding the resulting mixture to other monomers, a method of mixing the organic dye with a mixture of the monomers and other additives (F), and adding the catalyst, a method of mixing the organic dye with a mixture of the monomers, the catalyst, and other additives (F), and the like can be given.

When mixing the organic dye, the organic dye may be directly added or previously dissolved in a low-boiling-point organic solvent before adding to the components to be mixed, in which case, the organic solvent may be removed by vaporization by heating and/or under reduced pressure. The organic solvent used in the latter case is not particularly limited insofar as the solvent is chemically inert to the resin and has a moderately low boiling point. Examples of such an organic solvent include, but are not limited to, hexane, heptane, acetone, methyl ethyl ketone, benzene, toluene, dichloromethane, and chloroform.

The organic dye may be added to the resin composition (thermosetting resin composition or the later-described thermoplastic resin composition) in an amount corresponding to the concentration of the organic dye necessary for the plastic lens wafer, or a master batch which contains the organic dye at a concentration higher than the target concentration may be prepared and diluted by adding other necessary components to make the target concentration of the organic dye.

When dissolving the organic dye, the mixture may be heated to an extent that such heating does not cause the resin to deteriorate or adversely affect the working life of the resin. As the method for mixing the organic dye, general methods such as stirring, shaking, bubbling, and the like are can be given. Furthermore, it is desirable in many cases to defoam or filter the mixture under pressure or reduced pressure after dissolving the organic dye, as required.

Mixing Organic Dye with Thermoplastic Resin

The concentration of the organic dye in the plastic lens wafer of the thermoplastic spectacles lens of the present invention is in a range of 0.0002 wt % to 0.05 wt %, preferably 0.0002 wt % to 0.01 wt %, and more preferably 0.0004 wt % to 0.01 wt %. In order to obtain a mixture having the concentration in this range, the amount of the organic dye added to the thermoplastic resin composition can be easily determined based on the standard that the concentration is usually roughly the same as the target concentration of the plastic lens wafer.

The organic dye may be added to the thermoplastic resin composition in an amount corresponding to the concentration of the organic dye necessary for the plastic lens wafer made of the thermoplastic resin, or a master batch which contains one, or two or more necessary organic dyes at a concentration higher than the target concentration may be prepared and diluted by adding other necessary components to make the target concentration of the organic dye. In this instance, a thermoplastic resin not containing an organic dye may be added with an objective of dilution. The thermoplastic resin to which a prescribed amount of organic dye has been added may also be mixed by melt-kneading or the like, following which the mixture may be processed by pelletization or the like before being supplied to the cast molding die.

In the plastic spectacles lens of the thermosetting resin or the thermoplastic resin of the present invention, it is possible, as required, to add the organic dye of the present invention to at least one layer of the component layers which constitute the monolayer or multilayers applied to at least one side of the plastic lens wafer as a lens component, to prepared a plastic spectacles lens having selective optical absorption of the target wavelength.

Since the absorption index of the organic dye of the present invention at 585 nm (about 585±2 nm) is significantly larger than the absorption index of neodymium compounds, a sufficient shading effect can be obtained even if the organic dye is added to a thin coat layer.

In order to form a monolayer or multilayers on at least one side of the plastic lens wafer made of the thermosetting resin or thermoplastic resin, usually an organic resin coating agent which contains the organic dye of the present invention is applied, although it is possible to attach a sheet layer.

As examples of the organic resin coating agent, a (meth) acrylate resin, a polyester resin, a polyether resin, a polyurethane resin, a silicon-containing resin, a melamine resin, and the like can be given. A blend of these resin components or a copolymer can also be given. Either a thermosetting resin or a thermoplastic resin can be used according to the object.

In the application to a plastic lens wafer, the organic resin is applied without using a solvent or usually dissolved in a solvent to prepare a coating solution. As examples of the solvent, water, ketones such as acetone, methyl ethyl ketone, methyl isobutyl ketone, cyclohexanone, diacetone alcohol, and isophorone, esters such as methyl acetate, ethyl acetate, butyl acetate, isobutyl acetate, and amyl acetate, alcohol/esters such as ethylene glycol monomethyl ether, ethylene glycol monoethyl ether, and ethylene glycol monobutyl ether, alcohols such as methyl alcohol, ethyl alcohol, isopropyl alcohol, n-butyl alcohol, isobutyl alcohol, amyl alcohol, and 2-ethylhexyl alcohol, ethers such as dibutyl ether and tetrahydrofuran, aromatic hydrocarbons such as benzene, toluene, and xylene, aliphatic hydrocarbon such as n-hexane and n-heptane, alicyclic hydrocarbons such as cyclohexane, and the like can be given. A mixture of two or more solvents selected from these solvents can also be used. Selection of these solvents can be determined according to the purpose such as solubility of the resin components, the degree of reactivity with the resin components, the boiling point, environmental conformity, price, and the like.

In the application of the coating solution to the plastic lens wafer, a common method such as a dipping method, a spray method, a spin-coating method, a dipping spin-coat method, and a roll coating method, and the like can be employed. As required, the surface to be coated may be previously treated by plasma treatment, corona discharge treatment, UV irradiation treatment, or by chemical treatment using a silane coupling agent, sodium hydroxide, or the like.

In addition, a leveling agent such as a silicon-containing leveling agent or a fluorine-containing leveling agent may be added to the coating solution.

When the organic resin coating agent is a thermoplastic resin, a thermoplastic resin component layer containing the organic dye of the present invention can be obtained by vaporizing the solvent and drying the coating after applying the composition.

When the organic resin coating agent is a thermosetting resin, a thermosetting resin component layer containing the organic dye of the present invention can be obtained by vaporizing the solvent and drying the coating, and thereafter by curing the resin with heating, ultraviolet radiation, electron beams, or the like. It is possible to simultaneously apply the solvent drying conditions and the curing reaction conditions.

The thickness of the component layer after forming is 0.05 µm to 100 µm, preferably 0.1 µm to 50 µm, more preferably 0.5 µm to 30 µm, and particularly preferably 0.5 µm to 10 µm. The concentration of the organic dye in the above component layers is from 0.02 wt % to 5 wt %, and preferably 0.05 wt % to 3 wt %.

The organic dye may be included only in the plastic lens wafer or only in a hard coat layer, a primer layer, or another component-layer formed on one side or both sides of the plastic lens wafer. When there are two or more component layers, the organic dye may be included in at least one of the layers. The organic dye may also be included in both of the plastic lens wafer and the component layer.

Formation of component layers containing the organic dye of the present invention will be described in detail by way of a specific example. In a frequently employed embodiment, a primer layer is formed on one side of the thermosetting or thermoplastic plastic lens wafer, and a hard coat layer is applied on the surface of the primer layer to provide the lens wafer material surface with mechanical characteristic such as scratch resistance. Furthermore, a predetermined inorganic multilayer is produced on the surface of the hard coat layer, as required, to provide reflection preventing properties. The primer layer not only contributes to adhesiveness between the surface of the lens wafer and the hard coat layer, but its primary object is to provide a stress buffering effect to prevent deterioration of impact resistance of the lens due to provision of the hard coat layer and the reflection preventing layer.

The selective light blocking effect necessary in the present invention can be exhibited by adding the organic dye to the hard coat layer or the primer layer.

As the primer layer, for example, a polyurethane primer layer containing the organic dye of the present invention can be formed by preparing a primer solution by mixing a block-type polyisocyanate and a polyol at a proportion to make a isocyanate/hydroxyl group equivalent ratio of about 0.8 to 1.25, diluting the mixture with a solvent, adding a small amount of a tin catalyst and a leveling agent, and adding the organic dye of the present invention in an amount of 0.5 to 2 wt % of the resin component, treating both sides of the thiourethane thermosetting resin lens of (Ia) by dipping the lens in the primer solution, drying the treated surface by evaporating the solvent, and curing the resin at a temperature of 120° C. to 140° C.

In forming the primer layer, it is possible to form a polyurethane primer layer not containing the organic dye of the present invention and then to form a hard coat layer containing the organic dye of the present invention thereon. A common hard coat agent may be used.

For example, a composition containing (a) inorganic oxide compound particles having an average particle diameter of 50 to 200 Å such as particles of colloidal silicon oxide, colloidal aluminum oxide, colloidal antimony oxide, colloidal zirconium oxide, colloidal tungsten oxide, colloidal titanium oxide, colloidal zinc oxide, or colloidal tin oxide, or a metal compound which does not have a functional group such as an alkoxy metal compound having no functional group, and (b) a component obtained by cohydrolysis of a composition containing a silane compound which has a functional group such as an epoxy group or a methacryl group, as major components, can be given. As examples of the silane compound having a functional group, γ-glycidoxypropyltrimethoxysilane, γ-glycidoxypropylmethyldiethoxysilane, γ-methacryloyloxypropyltrimethoxysilane, and the like can be given. In addition to the above components, the hard coat agent may be used as a hard coat liquid, prepared by diluting the above-motioned components with a solvent which is substantially chemically inert to these components.

The hard coat liquid is applied on at least one primer-coated surface of the plastic lens and heated at a temperature of usually 60 to 140° C., and preferably 70 to 130° C. for curing the resin. In this instance, a catalyst such as an inorganic acid may be added to the hard coat liquid, as required. The curing reaction can also be carried out by irradiating with light such as ultraviolet radiation. In this instance, it is preferable to modify the surface of the colloidal inorganic oxide of (a) above with a vinyl group-containing organic group such as a (meth)acryl group or to use a photoinitiator or the like in combination. The thickness of the hard coat layer is in a range of 1 µm to 10 µm, and preferably 2 µm to 5 µm.

In this manner, the plastic lens provided with a hard coat layer containing the organic dye of the present invention via a polyurethane primer layer can be obtained by, for example, previously adding the organic dye of the present invention to the above-mentioned hard coat liquid in an amount of 0.5 to 2 wt % of the resin component, further adding a leveling agent to obtain a dye-containing hard coat liquid, applying the dye-containing hard coat liquid to both sides of the thiourethane thermosetting resin lens of (Ia) with a primer layer provided on the both sides by dipping the lens in the dye-containing hard coat liquid, drying the treated surface by evaporating the solvent, and curing the resin at 120° C. for three hours.

The plastic lens containing the organic dye of the present invention may be provided with a functional treatment that is generally applicable, such as a multi-coat (antireflection layer), a cloud-preventing treatment, a water repelling treatment, or an antistatic treatment, as required.

EXAMPLES

The present invention will now be described in detail by way of examples, which should not be construed as limiting the present invention.

First, the absorption peak characteristic determined from the absorption spectrum of the dyes used in Examples or Comparative Examples are shown in Table 1.

Table 1 shows the absorption spectrum of PD-311S and TY-102 which are organic dyes of the present invention.

TABLE I

| Dye | Solvent | Peak (P) (nm) | Peak (P) absorption Pmax | Width at ¼ (nm) | Width at ½ (nm) | Width at ⅔ (nm) |
|---|---|---|---|---|---|---|
| PD-311S | Chloroform | 585 | $2.72 \times 10^5$ | 30 | 18 | 14 |

TABLE I-continued

| Dye | Solvent | Peak (P) (nm) | Peak (P) absorption Pmax | Width at ¼ (nm) | Width at ½ (nm) | Width at ⅔ (nm) |
|---|---|---|---|---|---|---|
| TY-102 | Chloroform | 588 | $2.27 \times 10^5$ | 70 | 29 | 22 |

PD-311S: manufactured by Mitsui Chemical, Inc.
TY-102 (ADEKA ARKLS): manufactured by Asahi Denka Kogyo Co., Ltd.
The unit of the peak (P) absorption was ml/g · cm.
An absorption measuring instrument "UV/VIS SPECTROMETER V-550" manufactured by JASCO was used for measuring the absorption.

Example 1

0.0010 parts by weight of "PD-311S" manufactured by Mitsui Chemicals, Inc. was added to 50.6 parts by weight of bis(isocyanatemethyl)bicyclo[2.2.1]heptane (mixture of a 2,5-isomer and a 2,6-isomer) and the mixture was stirred to obtain a homogeneous solution. 23.9 parts by weight of pentaerythritoltetrakis(3-mercaptopropionate), 25.5 parts by weight of 4-mercaptomethyl-1,8-dimercapto-3,6-dithiaoctane, 0.02 parts by weight of dibutyltin dichloride as a curing promoter, 0.13 parts by weight of "Zelec UN" (registered trademark, manufactured by Stepan Company) as a parting agent, and 0.05 parts by weight of "Seesorb 709" (manufactured by Sypro Chemical Co.) as a UV absorber were added and dissolved with stirring, followed by deforming at room temperature under reduced pressure. The monomer mixture thus obtained was filtered through a 3 µm filter. The filtrate was poured into a lens cast molding die through a tube. The casting lens cast molding die is a plano-type having front and rear flat plates, with a distance of 2.2 mm. The casting lens cast molding die after casting the resin was closed and placed in a hot-blast circling oven, heated from 20° C. to 130° C. in 26 hours, maintained at 130° C. for four hours, and gradually cooled before removing from the oven. The molded product was removed from the casting lens cast molding die and annealed at 130° C. for two hours to obtain a thermosetting plastic spectacles lens containing an organic dye. The transmittance spectrum of the resulting lens is shown in FIG. 1. In this Example, the wavelength in the minimum transmittance peak was 588.0 nm.

The results of measurement of the light transmitted through the lens using a color meter are shown in Table 2. The color tone of the light observed through the lens was purplish blue. In the observation through the lens, lines of small branches of a tree on a fine day and a contrast of red, yellow, and green were very distinct.

Example 2

Figure 2:
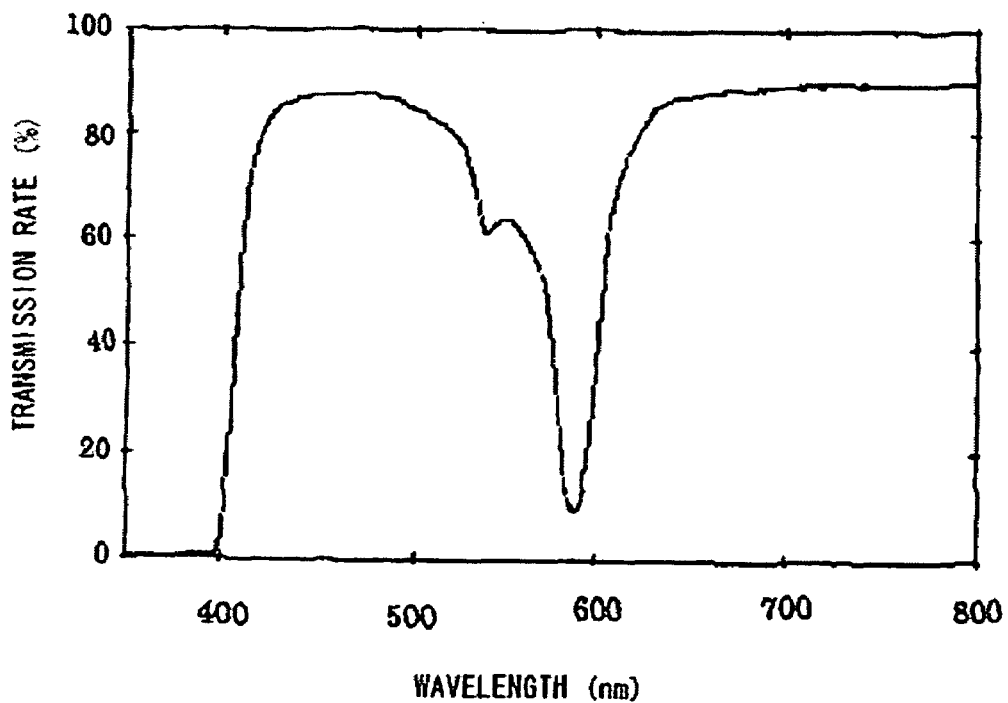
FIG. 2 is a graph showing the spectral transmission rate of the lens produced in Example 2.

A thermoplastic plastic spectacles lens was obtained in the same manner as in Example 1, except for using 0.0020 wt % of "PD-311S" manufactured by Mitsui Chemicals, Inc. Transmittance spectrum of the resulting lens is shown in FIG. 2. In this Example, the wavelength in the minimum transmittance peak was 588.0 nm.

The results of measurement of the light transmitted through the lens using a color meter are shown in Table 2. The color tone of the light observed through the lens was purplish blue. In the observation through the lens, lines of small branches of a tree on a fine day and a contrast of red, yellow, and green were very distinct.

TABLE 2

| | Measurement result of transmitted light | | | |
|---|---|---|---|---|
| | L* | a* | b* | Y |
| Example 1 | 88.64 | −5.41 | −10.42 | 73.4 |
| Example 2 | 83.20 | −6.31 | −18.61 | 62.53 |

L*, a*, and b* are the color indication methods according to JIS.
Y is luminous transmission rate (unit: %).
A transmission rate meter "UV-160A" manufactured by SHIMADZU was used for measuring the transmission rate.

Example 3

A monomer mixture to be charged into the cast lens cast molding die was prepared in the same manner as in Example 1, except for using the dye shown in Table 3 in an amount shown in the Table. A thermosetting plastic spectacles lens having a desired color tone was obtained in the same manner as in Example 1 from the monomer mixture.

Figure 3:
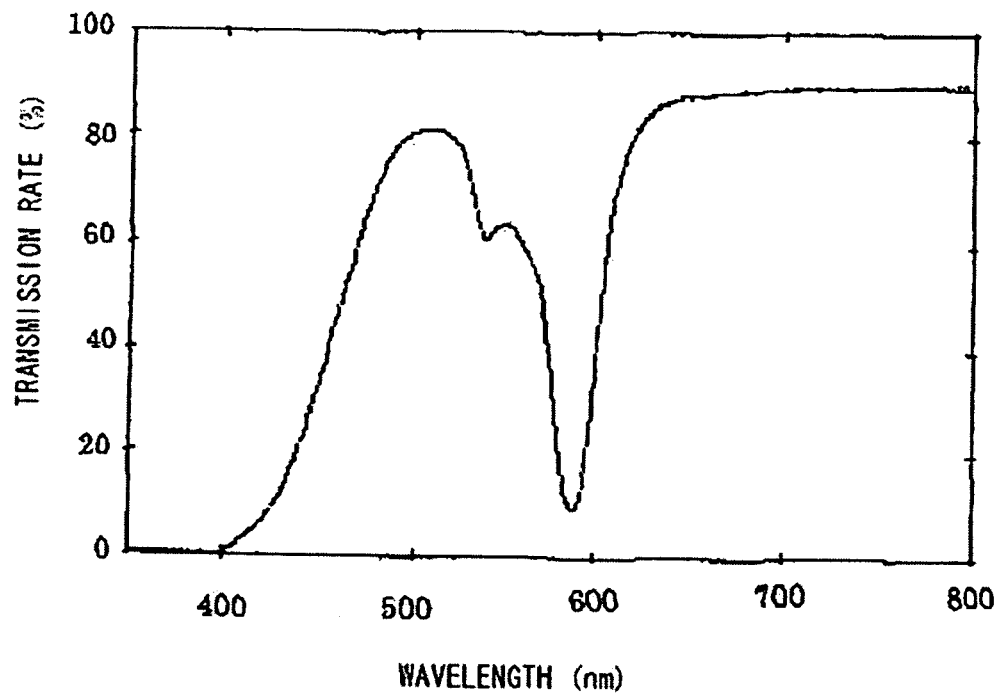
FIG. 3 is a graph showing the spectral transmission rate of the lens produced in Example 3.
Figure 4:
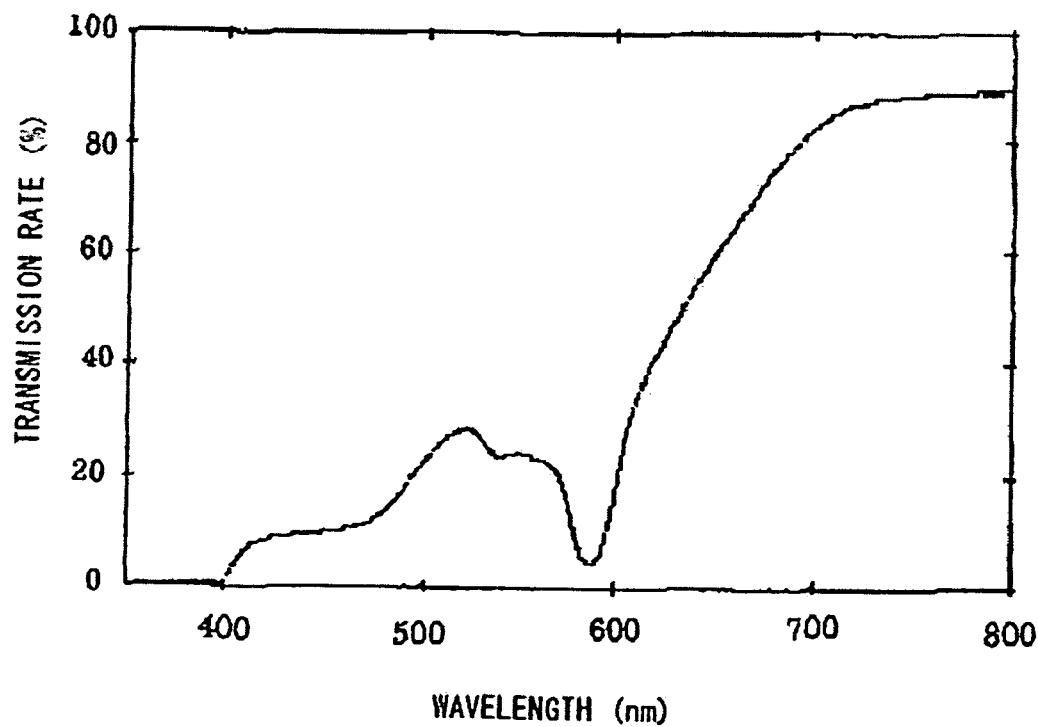
FIG. 4 is a graph showing the spectral transmission rate of the lens produced in Example 4.
Figure 5:
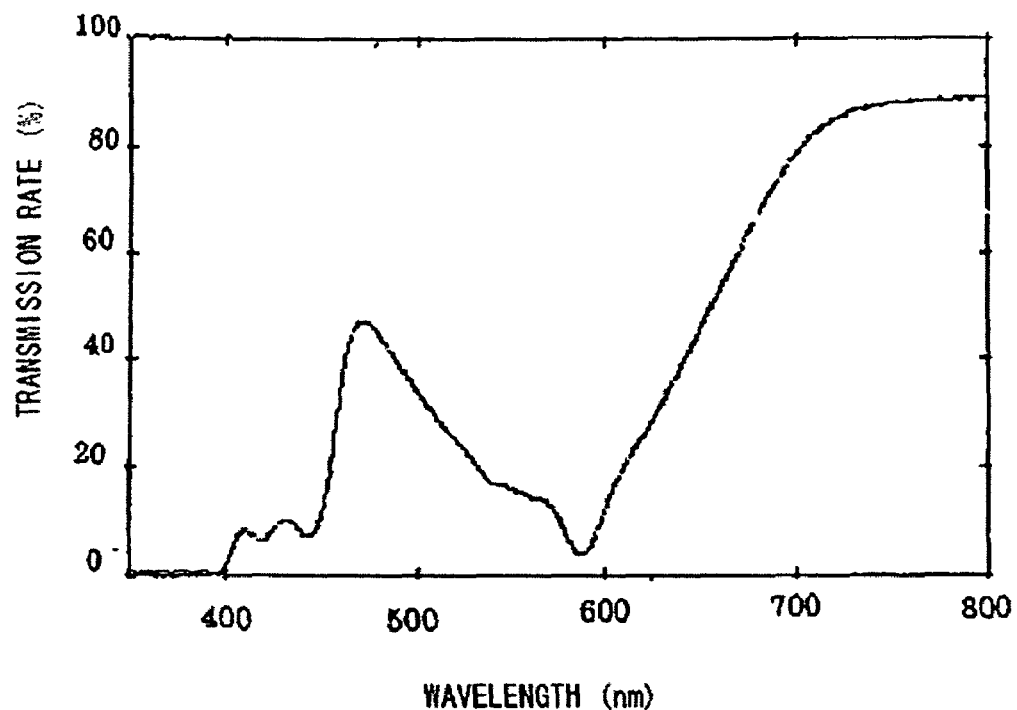
FIG. 5 is a graph showing the spectral transmission rate of the lens produced in Example 5.
Figure 6:
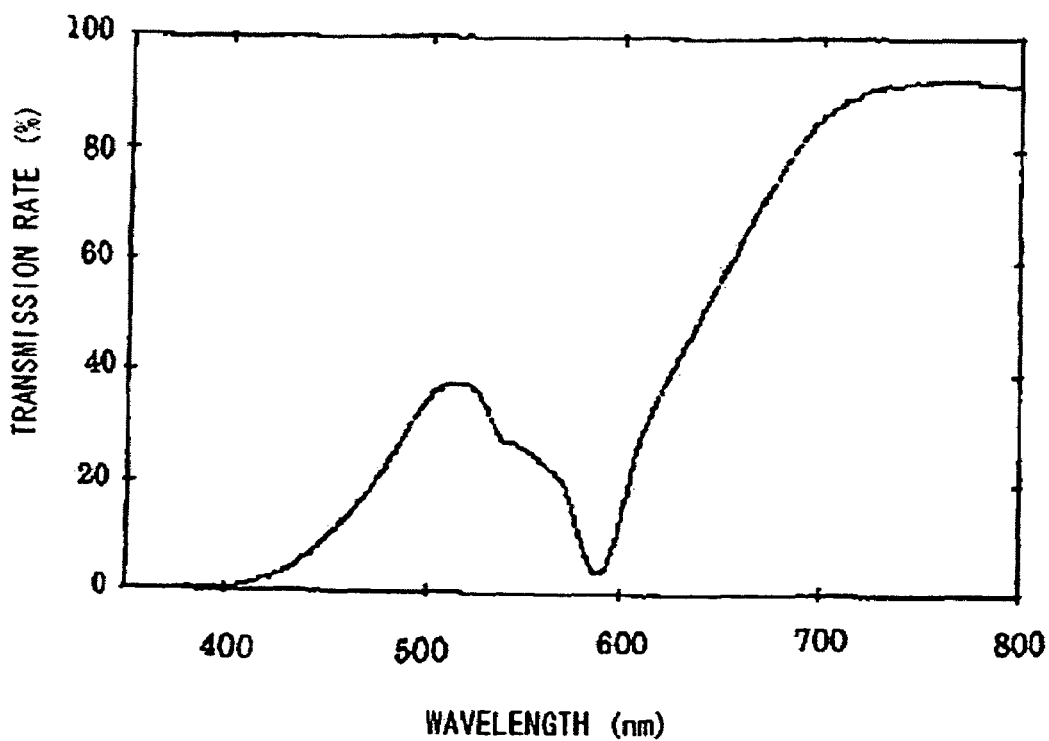
FIG. 6 is a graph showing the spectral transmission rate of the lens produced in Example 6.
Figure 9:
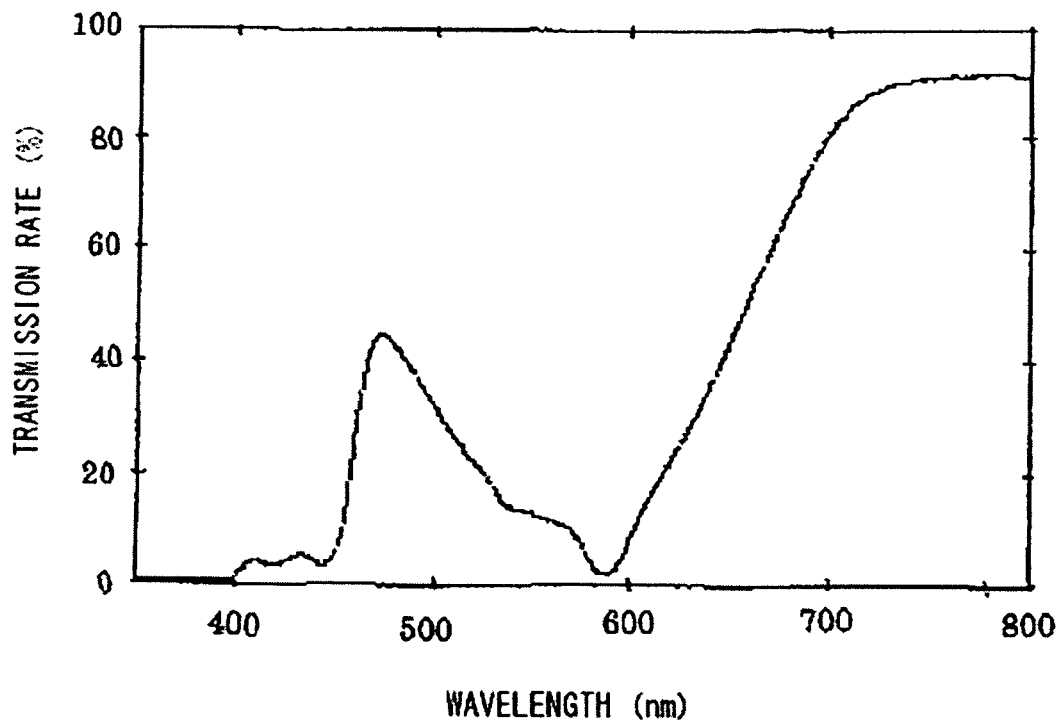
FIG. 9 is a graph showing the spectral transmission rate of the lens produced in Example 9.

The transmittance spectrum of the resulting lens is shown in FIG. 3. In this Example, the wavelength in the minimum transmittance peak was 588.0 nm. The results of color meter measurement of the light transmitted through the lens and the color tone observed through the lens are shown in Table 4. In the observation through the lens, lines of small branches of a tree on a fine day and a contrast of red, yellow, and green were very distinct.

Examples 4 to 9

Monomer mixtures to be charged to the cast lens cast molding die was prepared in the same manner as in Example 1, except for using the dye shown in Table 3 in an amount shown in the Table. Thermosetting plastic spectacles lenses with desired color tones were prepared in the same manner as in Example 1, except for using the obtained monomer mixtures and using a casting lens cast molding die with both front and rear surfaces of 8R and a distance of 2.2 mm.

The transmittance spectra of the resulting lenses are shown in FIGS. 4 to 9. The wavelengths in the minimum transmittance peak in these Examples were as follows.

Example 4 (FIG. 4): 587.5 nm

Example 5 (FIG. 5): 588.0 nm

Example 6 (FIG. 6): 588.0 nm

Example 7 (FIG. 7): 587.5 nm

Example 8 (FIG. 8): 588.0 nm

Example 9 (FIG. 9): 588.0 nm

The results of color meter measurement of the light transmitted through the lens and the color tone observed through the lens are shown in Table 4. In the observation through the lenses obtained in Examples 4 to 9, lines of small branches of a tree on a fine day and a contrast of red, yellow, and green were very distinct.

TABLE 3

| | Dye | | | | | |
|---|---|---|---|---|---|---|
| | PD-311S | Blue | Y2G | KP-R | KP-Y | Y.S.5R |
| Example 3 | 0.0020 | — | — | — | 0.0060 | — |
| Example 4 | 0.0020 | 0.0040 | — | 0.0030 | 0.0025 | 0.0120 |

TABLE 3-continued

| | Dye | | | | | |
|---|---|---|---|---|---|---|
| | PD-311S | Blue | Y2G | KP-R | KP-Y | Y.S.5R |
| Example 5 | 0.0015 | 0.0070 | 0.0030 | 0.0032 | — | — |
| Example 6 | 0.0020 | 0.0050 | — | 0.0010 | 0.0070 | 0.0080 |
| Example 7 | 0.0020 | 0.0040 | — | 0.0060 | 0.0065 | 0.0050 |
| Example 8 | 0.0025 | 0.0060 | — | 0.0036 | 0.0040 | 0.0144 |
| Example 9 | 0.0020 | 0.0080 | 0.0040 | 0.0035 | — | — |

The units in the Table are parts by weight.

The following organic dyes were used.

Blue: "Blueup-R" (manufactured by Hokuriku Color Co., Ltd.)

Y2G: "Y2G" (manufactured by Hokuriku Color Co., Ltd.)

KP-R: "KPPLASTRED" (Kiwa Chemical Industries, Ltd.)

KP-Y: "KPPLASTYELLOW" (Kiwa Chemical Industries, Ltd.)

Y.S,5R: "Y.S,5R" (manufactured by Hokuriku Color Co., Ltd.)

TABLE 4

| | Result of color meter measurement | | | | Color of |
|---|---|---|---|---|---|
| | L* | a* | b* | Y | lens |
| Example 3 | 81.75 | −23.53 | 25.74 | 59.84 | Green |
| Example 4 | 55.08 | 1.2 | 26.69 | 23.01 | Brown |
| Example 5 | 52.35 | −11.14 | −2.48 | 20.46 | Gray |
| Example 6 | 56.55 | −15.65 | 28.81 | 24.46 | Moss green |
| Example 7 | 50.78 | 7.66 | 22.03 | 19.08 | Copper |
| Example 8 | 45.52 | 1.91 | 27.37 | 14.91 | Dark brown |
| Example 9 | 48.86 | −15.01 | 0.56 | 17.48 | Dark gray |

Examples 10 and 11

Figure 10:
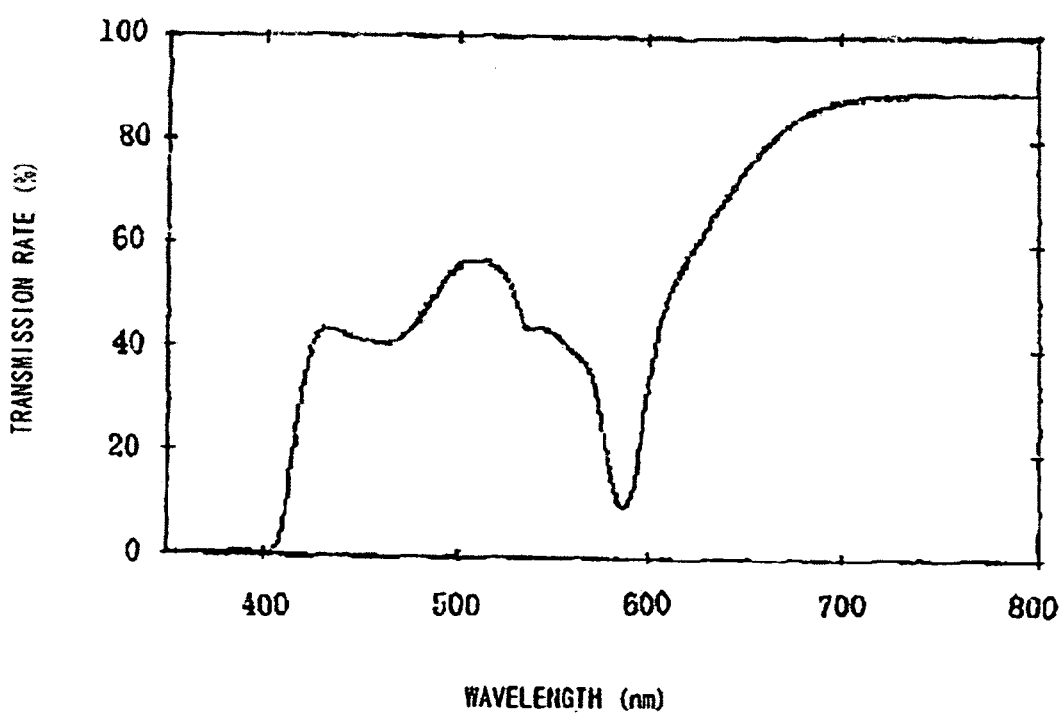
FIG. 10 is a graph showing the spectral transmission rate of the lens produced in Example 10.

A tank with the inner wall formed of stainless steel (SS) was charged with 100 parts by weight of polycarbonate resin pellets ("PANLITE L-1250VX" (Natural), manufactured by Teijin, Ltd.) which is a thermoplastic resin, and the dyes shown in Table 5 in the amounts indicated therein to cause the dyes to be adsorbed onto the surface of the pellets. The resulting mixtures were dried at 120° C. for 12 hours and injected from an injection molding machine of which the temperature was controlled at 260 to 300° C. to obtain lenses with an external diameter of 73 mm and the central thickness of 2 mm. Transmittance spectra of the resulting lenses are shown in FIGS. 10 and 1. The wavelength in the minimum transmission peak, color tone, and luminous transmittance measured by a luminous transmittance meter of each lens were as follows.

Example 10 (FIG. 10): 586.0 nm (peak wavelength), gray (color tone), 40.0% (luminous transmittance)

Figure 11:
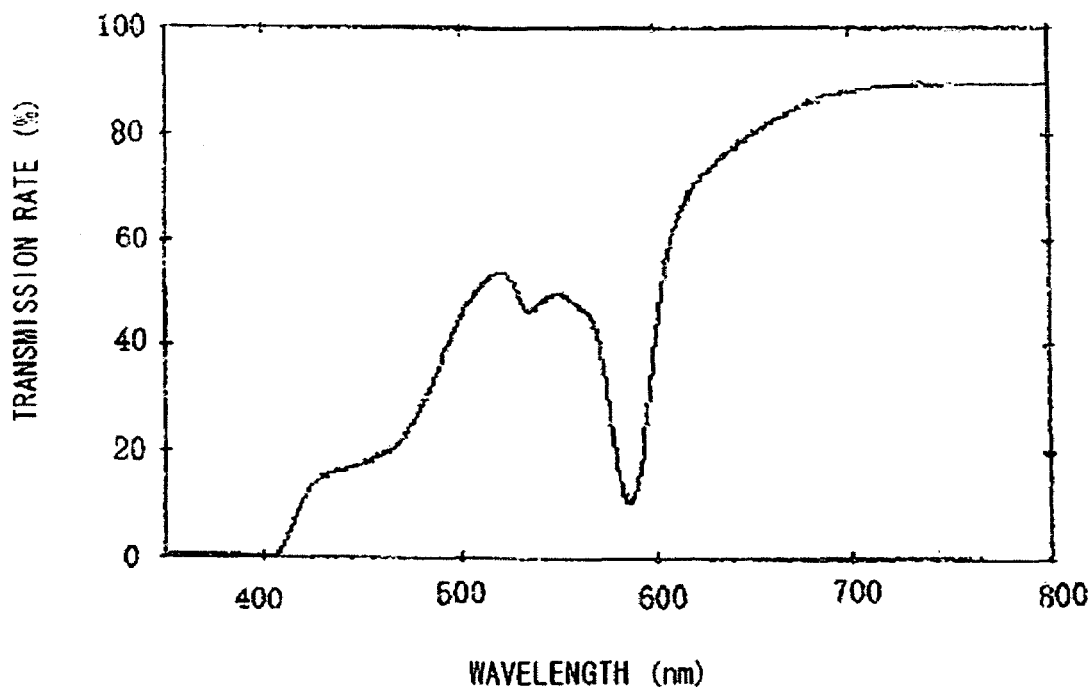
FIG. 11 is a graph showing the spectral transmission rate of the lens produced in Example 11.

Example 11 (FIG. 11): 585.9 nm (peak wavelength), brown (color tone), 49.1% (luminous transmittance)

In the observation through the lens, lines of small branches of a tree on a fine day and a contrast of red, yellow, and green were very distinct.

TABLE 5

| | Dye | | | | | |
|---|---|---|---|---|---|---|
| | PD-311S | Blue-2 | Blue-3 | KP-R | KP-Y | Y.S.5R |
| Example 10 | 0.0020 | — | 0.0035 | 0.0005 | — | 0.0072 |
| Example 11 | 0.0020 | 0.0013 | — | 0.0020 | 0.0025 | 0.0120 |

The units in the Table are part by weight.
Blue-2: Blue up-R-3 (manufactured by Hokuriku Color Co., Ltd.)
Blue-3: Blue up-R-3 (manufactured by Hokuriku Color Co., Ltd.)
The footnote of Table 3 is applied to other dyes.

Examples 12 and 13

Figure 12:
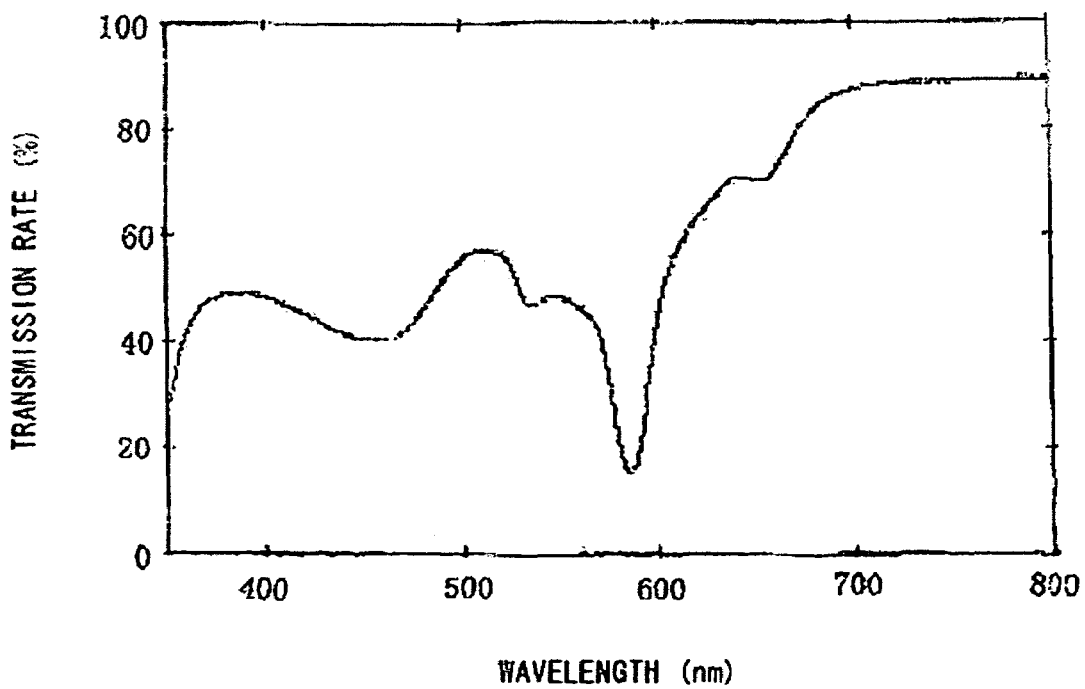
FIG. 12 is a graph showing the spectral transmission rate of the lens produced in Example 12.
Figure 13:
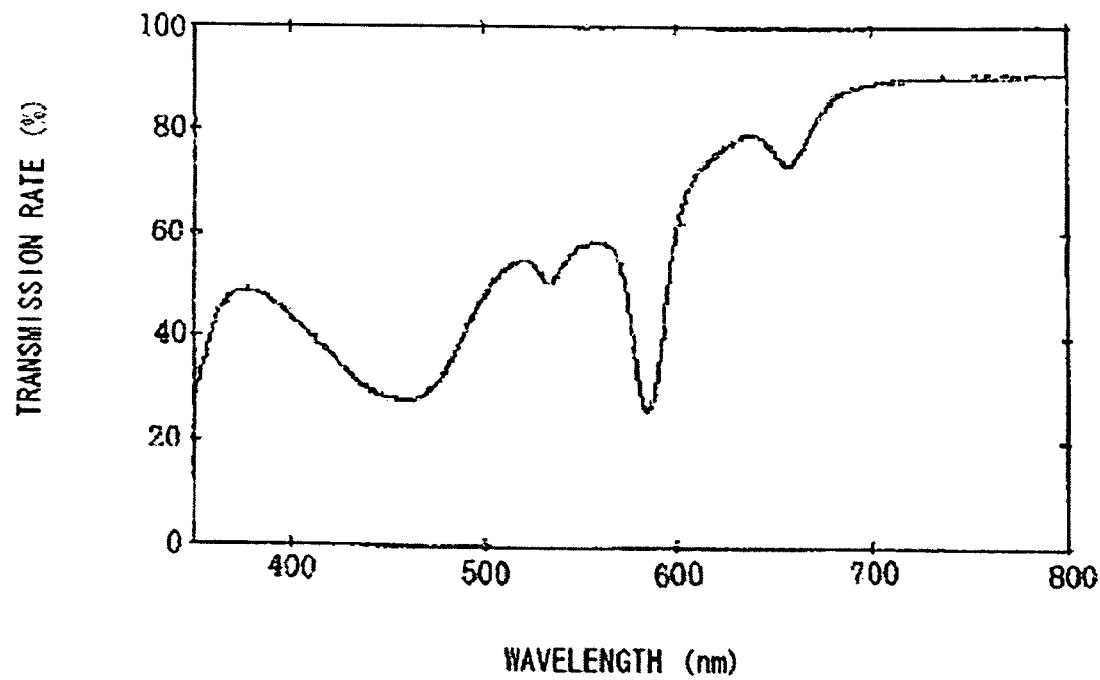
FIG. 13 is a graph showing the spectral transmission rate of the lens produced in Example 13.

A tank with the inner wall formed from SS was charged with 100 parts by weight of polyamide resin pellets ("Grilamid TR90" (Natural), manufactured by EMS CHEMIE) and the dyes shown in Table 6 in the amounts indicated therein to cause the dyes to be adsorbed on the surface of the pellets. The resulting mixtures were dried at 80° C. under reduced pressure for 12 hours and injected from an injection molding machine of which the temperature was controlled at 250 to 290° C. to obtain lenses with an external diameter of 73 mm and a central thickness of 2 mm. Transmittance spectra of the resulting lenses are shown in FIGS. 12 and 13. The wavelength in the minimum transmission peak, color tone, and luminous transmittance measured by a luminous transmittance meter of each lens were as follows.

Example 12 (FIG. 12): 585.2 nm (peak wavelength), gray (color tone), 46.5% (luminous transmittance)

Example 13 (FIG. 13): 585.1 nm (peak wavelength), brown (color tone), 55.8% (luminous transmittance)

In the observation through the lens, lines of small branches of a tree on a fine day and a contrast of red, yellow, and green were very distinct.

TABLE 6

| Dye | PD-311S | Blue-3 | KP-R | KP-Y | Y.S.5R |
|---|---|---|---|---|---|
| Example 12 | 0.0020 | 0.0035 | 0.0005 | — | 0.0072 |
| Example 13 | 0.0020 | 0.0013 | 0.0020 | 0.0025 | 0.0120 |

The units in the Table are parts by weight.
The footnotes of Tables 3 and 5 apply to the color symbols.

Comparative Example 1

Figure 14:
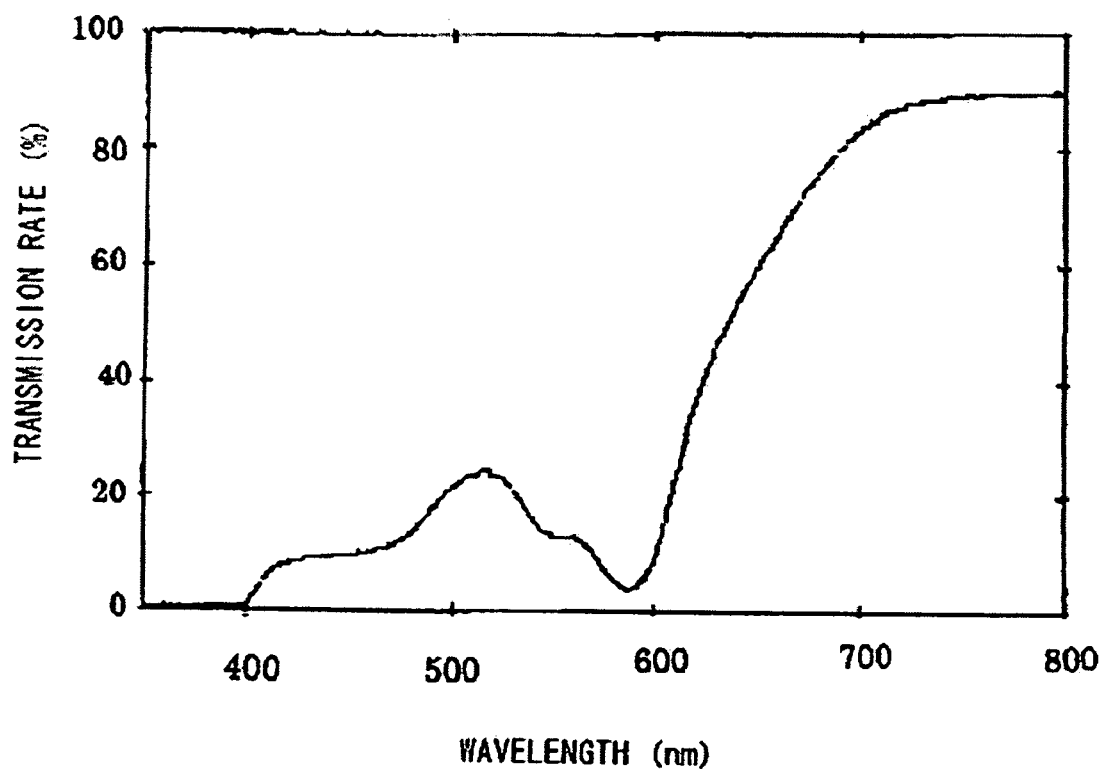
FIG. 14 is a graph showing the spectral transmission rate of the lens produced in Example 14.

A thermosetting plastic spectacles lens was prepared in the same manner as in Example 1, except for using 0.00115 parts by weight of TY-102 ("ADEKA ARKLS" manufactured by Asahi Denka Kogyo Co., Ltd.), which is an example of a dye having an absorption peak near 585 nm (about 585±2 nm) in the absorption spectrum as shown in Table 1, but having a peak line width significantly larger than the range of the present invention. Transmittance spectrum of the resulting lens is shown in FIG. 14. In this Comparative Example, the wavelength in the minimum transmittance peak was 587.0 nm. The results of measurement of the light transmitted through the lens using a color meter are shown in Table 7. The color tone of the light observed through the lens was pale purplish blue. In the observation through the lens, lines of small branches of a tree on a fine day and a contrast of red, yellow, and green were distinct.

Comparative Example 2

Figure 15:
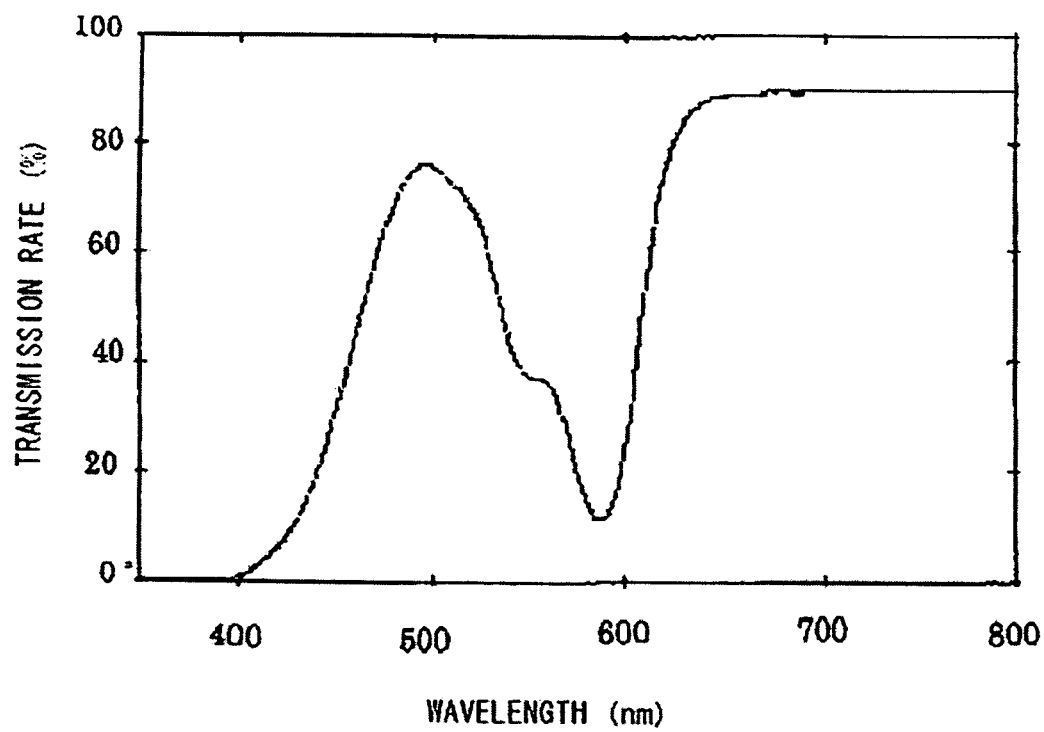
FIG. 15 is a graph showing the spectral transmission rate of the lens produced in Example 15.

A thermoplastic plastic spectacles lens with a color tone was prepared in the same manner as in Example 1, except for using the dyes shown in Table 8 in amounts shown in the Table. Transmittance spectrum of the resulting lens is shown in FIG. 15. In this Comparative Example, the wavelength in the minimum transmittance peak was 587.5 nm. The results of measurement of the light transmitted through the lens using a color meter are shown in Table 7. In the observation through the lens, lines of small branches of a tree on a fine day and a contrast of red, yellow, and green were distinct. However, the color tone observed through the lens was rather pale green which was not only indistinct, but also slightly dull.

Comparative Example 3

Figure 16:
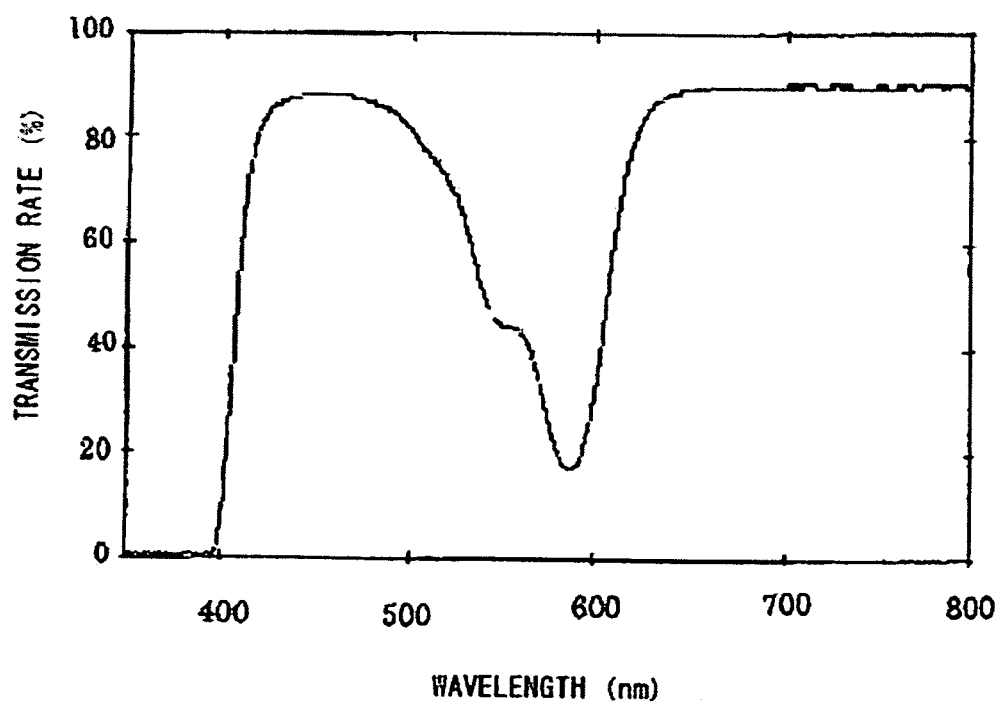
FIG. 16 is a graph showing the spectral transmission rate of the lens produced in Example 16.

A thermosetting plastic spectacles lens with a color tone was prepared in the same manner as in Example 4, except for using the dyes shown in Table 8 in amounts shown in the Table. Transmittance spectrum of the resulting lens is shown in FIG. 16. In this Comparative Example, the wavelength in the minimum transmittance peak was 587.0 nm. The results of measurement of the light transmitted through the lens using a color meter are shown in Table 7. In the observation through the lens, lines of small branches of a tree on a fine day and a contrast of red, yellow, and green were distinct. However, the color tone observed through the lens was not brown, but a pale copper color. In addition, the color was slightly dull. The results of measurement of the light transmitted by the lens using a color meter are shown in Table 6. Although lines of small branches of a tree on a fine day and a contrast of red, yellow, and green observed through the lens were more distinct than the view observed without the lens, distinctiveness considerably decreased in a dark field.

TABLE 7

| | Measurement result of transmitted light | | | |
|---|---|---|---|---|
| | L* | a* | b* | Y |
| Comparative Example 2 | 80.32 | 4.65 | −23.92 | 57.25 |
| Comparative Example 3 | 75.43 | −12.42 | 16.17 | 48.97 |

The units in the Table are parts by weight.

TABLE 8

| | Dye | | | | | |
|---|---|---|---|---|---|---|
| | TY-102 | Blue | Y2G | KP-R | KP-Y | Y.S.5R |
| Comparative Example 2 | 0.00115 | — | — | — | 0.0060 | — |
| Comparative Example 3 | 0.0015 | 0.0040 | — | 0.0030 | 0.0025 | 0.0120 |

The present invention is applicable to a plastic spectacles lens using a specific dye not containing a rare earth metal such as a neodymium compound. The plastic spectacles lens of the present invention excels in a dazzle-preventing effect, provides a bright view with distinct images and colors, and can be provided with a desired color tone by mixing the dyes. The plastic spectacles lens of the present invention may be formed of a plastic lens wafer alone molded from a thermosetting resin or a thermoplastic resin or may be formed of the plastic lens wafer and one, or two or more component layers (including a hard coat layer, a primer layer, and other components layers) on at least one side of the plastic lens wafer.

What is claimed is:

1. A plastic spectacles lens comprising a plastic lens wafer formed from a thermosetting or thermoplastic resin or the plastic lens wafer and one, or two or more component layers formed on at least one side of the plastic lens wafer, either the plastic lens wafer or at least one of the component layers comprising an organic dye which exhibits a sharp absorption satisfying the following conditions (A), whereby the plastic spectacles lens need not substantially contain a rare earth metal: and the conditions (A) are made up as follows: the visible ray absorption spectrum measured in a chloroform or toluene solution of the organic dye has a main absorption peak (P) between 565 nm and 605 nm, the coefficient of absorption index (ml/g·cm) of the apex (Pmax: a point at which the coefficient of absorption is maximum) is $0.5 \times 10^5$ or more, the peak width at ¼ of the absorption at the apex (Pmax) of the peak (P) is 50 nm or less, the peak width at ½ of the absorption at the apex (Pmax) of the peak (P) is 30 nm or less, and the peak width at ⅔ of the absorption at the apex (Pmax) of the peak (P) is 20 nm or less.

2. The plastic spectacles lens according to claim 1, wherein the apex (Pmax) of the main absorption peak (P) is between 580 nm and 590 nm.

3. The plastic spectacles lens according to claim 1, wherein the wavelength position of the minimal rate of the transmission in the transmission spectrum of the lens is more than 585 nm but 600 nm or less.

4. The plastic spectacles lens according to claim 1, wherein the organic dye is a tetraazaporphyrin compound shown by the formula (1),

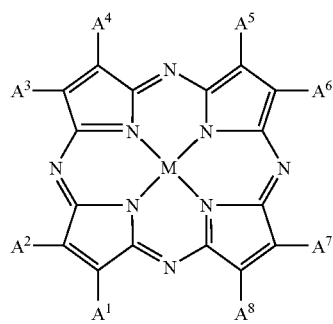

wherein $A^1$ to $A^8$ are individually a hydrogen atom, a halogen atom, a nitro group, a cyano group, a hydroxyl group, an amino group, a carboxyl group, a sulfonic acid group, a linear, branched, or cyclic alkyl group having 1 to 20 carbon atoms, an alkoxy group having 1 to 20 carbon atoms, an aryloxy group having 6 to 20 carbon atoms, a monoalkylamino group having 1 to 20 carbon atoms, a dialkylamino group having 2 to 20 carbon atoms, a dialkylamino group having 2 to 20 carbon atoms, a dialkylamino group having 7 to 20 carbon atoms, an aralkyl group having 7 to 20 carbon atoms, an aryl group having 6 to 20 carbon atoms, a heteroaryl group, an alkylthio group having 6 to 20 carbon atoms, or an arylthio group having 6 to 20 carbon atoms, and may form a ring excluding an aromatic ring via a linkage group; and M represents two hydrogen atoms, a divalent metal atom, a divalent mono-substituted metal atom, a tetravalent di-substituted metal atom, or an oxy metal atom.

5. The plastic spectacles lens according to claim 4, wherein M is a divalent copper atom.

6. The plastic spectacles lens according to claim 4, wherein the tetraazaporphyrin compound is a tetra-t-butyltetraazaporphyrin copper complex shown by the formula (2),

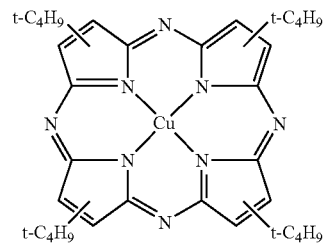

wherein Cu indicates a divalent copper and $t-C_4H_9$ indicates a t-butyl group which may be located in any position from $A^1$ to $A^8$ of the formula (1) to form a position isomer structure.

7. The plastic spectacles lens according to any one of claim 1, wherein the organic dye is previously incorporated in the plastic lens wafer.

8. The plastic spectacles lens according to claim 1, wherein the organic dye is previously incorporated and dispersed in substantially the entire area of the plastic lens wafer at a concentration of 0.0002 to 0.05 wt % of the plastic lens wafer.

9. The plastic spectacles lens according to claim 7, wherein the organic dye is localized at a depth of 500 μm or less from at least one of the surfaces of the plastic lens wafer.

10. The plastic spectacles lens according to claim 1, wherein, in the case in which at least one of the layers forming the component layer contains the organic dye, the concentration of the organic dye in at least one of the component layers is 0.02 to 5 wt %.

11. The plastic spectacles lens according to claim 1, wherein the thermosetting resin is a urethane thermosetting resin or (meth)acrylate thermosetting resin.

12. The plastic spectacles lens according to claim 11, wherein the urethane thermosetting resin is a thiourethane thermosetting resin made from a polythiol as a monomer component or a urethane thermosetting resin made from a polyol as a monomer component.

13. The plastic spectacles lens according to claim 1, wherein the thermoplastic resin is a polycarbonate resin or a polyamide resin.

14. The plastic spectacles lens according to claim 1, wherein the thermoplastic resin comprises 100 parts by weight of a polycarbonate resin and 0.5 to 30 parts by weight a polyamide resin.

15. The plastic spectacles lens according to claim 1, wherein at least one component layer is formed from an organic resin coating agent.

16. The plastic spectacles lens according to claim 15, wherein the organic resin coating agent is a thermoplastic organic resin coating agent or a thermosetting organic resin coating agent.

17. A thermoplastic spectacles lens according to claim 1, wherein at least one layer forming the component layer is a hard coat layer.

18. The plastic spectacles lens according to claim 1, wherein at least one layer forming the component layer is a primer layer which is in contract with the hard coat layer.

19. The plastic spectacles lens according to claim 1, wherein the lens is dyed with one or more organic dyes other than the organic dye satisfying the conditions (A).

20. The plastic spectacles lens according to claim 12, wherein the thiourethane thermosetting resin is a resin obtained by reacting one, or two or more iso(thio)cyanate compounds (B) selected from a group consisting of a polyisocyanate compound, an isocyanate compound having an isothiocyanate group, and a polyisothiocyanate compound and an active hydrogen compound (C), wherein the active hydrogen compound (C) is one, or two or more thiol-type active hydrogen compounds (C1) selected from the group consisting of a thiol compound having a hydroxyl group and a polythiol compound or a hydroxyl group-type active hydrogen compound which has a hydroxyl group (C2).

21. The plastic spectacles lens according to claim 20, wherein the iso(thio)cyanate compound (B) is a diisocyanate compound and the active hydrogen compound (C) is a polythiol compound.

22. The plastic spectacles lens according to claim 20, wherein the iso(thio)cyanate compound (B) is one, or two or more diisocyanate selected from a group consisting of 2,5-bis(isocyanatemethyl)bicyclo[2,2,1]-heptane, 2,6-bis(isocyanatemethyl)bicyclo[2,2,1]-heptane, and m-xylylenediisocyanate and the active hydrogen compound (C) is one, or two or more polythiol compounds selected from a group consisting of pentaerythritoltetrakis(3-mercaptopropionate), 4-mercaptomethyl-1,8-dimercapto-3,6-dithiaoctane, 5,7-dimercaptomethyl-1,11-mercapto-3,6,9-trithiaundecane, 4,7-dimercaptomethyl-1,11-mercapto-3,6,9-trithiaundecane, 4,7-dimercaptomethyl-1,1'-mercapto-3,6,9-trithiaundecane, 4,8-dimercaptomethyl-1,11-mercapto-3,6,9-trithiaundecane, 1,1,3,3-tetrakis(mercaptomethylthio)propane, 4,6-bis(mercaptomethylthio)-1,3-dithian, and 2-(2,2-bis(mercaptomethylthio)ethyl)-1,3-dithiethane.

23. The plastic spectacles lens according to claim 11, wherein the (meth)acrylate thermosetting resin is a resin obtained by the polymerization reaction of a (meth)acrylate monomer-containing composition comprising a mixture of 70 to 100 wt % of one, or two or more monomers selected from a group consisting of polyfunctional (meth)acrylates (D) and 0 to 30 wt % of one, or two or more monomers selected from a group consisting of a monofunctional or polyfunctional vinyl compound (E-1) which conjugates with an aromatic group and/or a monofunctional vinyl compound (E-2) which conjugates with a carbonyl group, as a main component.

* * * * *